(12) United States Patent
Ryang

(10) Patent No.: US 7,645,436 B1
(45) Date of Patent: Jan. 12, 2010

(54) TRACTABLE METAL OXIDE SOLS AND NANOCOMPOSITES THEREFROM

(75) Inventor: Hong-Son Ryang, Camarillo, CA (US)

(73) Assignee: APS Laboratory, Camarillo, CA (US)

( * ) Notice: Subject to any disclaimer, the term of this patent is extended or adjusted under 35 U.S.C. 154(b) by 611 days.

(21) Appl. No.: 11/403,059

(22) Filed: Apr. 12, 2006

Related U.S. Application Data

(63) Continuation-in-part of application No. 10/886,143, filed on Jul. 7, 2004, now Pat. No. 7,153,898, which is a continuation-in-part of application No. 10/337,624, filed on Jan. 7, 2003, now Pat. No. 6,955,771.

(51) Int. Cl.
*C01B 17/20* (2006.01)
*C01B 13/14* (2006.01)
*C01B 25/163* (2006.01)
*C01B 25/37* (2006.01)

(52) U.S. Cl. .................. 423/511; 423/479; 423/299; 977/773; 75/371

(58) Field of Classification Search .......... 423/511, 423/479, 299; 977/773; 75/371
See application file for complete search history.

(56) References Cited

U.S. PATENT DOCUMENTS

| | | | |
|---|---|---|---|
| 4,571,365 A * | 2/1986 | Ashlock et al. ............ 428/412 |
| 4,980,427 A | 12/1990 | Ryang | |
| 5,165,992 A * | 11/1992 | Yajima ..................... 428/328 |
| 5,962,608 A | 10/1999 | Ryang et al. | |
| 6,169,119 B1 | 1/2001 | Ryang et al. | |
| 6,261,687 B1 | 7/2001 | Ryang et al. | |
| 6,500,871 B1 | 12/2002 | Gerardin et al. | |
| 6,579,472 B2 | 6/2003 | Chung et al. | |
| 6,838,486 B2 * | 1/2005 | Ryang ........................ 516/90 |
| 6,955,771 B2 * | 10/2005 | Ryang ................... 252/389.31 |
| 7,153,898 B2 * | 12/2006 | Ryang ........................ 524/183 |
| 7,169,375 B2 * | 1/2007 | Chisholm ................ 423/592.1 |
| 7,264,874 B2 * | 9/2007 | Ryang ........................ 428/402 |
| 2001/0056141 A1 * | 12/2001 | Schutt ........................ 524/261 |
| 2003/0024432 A1 | 2/2003 | Chung et al. | |
| 2003/0133890 A1 | 7/2003 | Kato et al. | |
| 2003/0144469 A1 | 7/2003 | Kauffman et al. | |

OTHER PUBLICATIONS

International Search Report for PCT/US04/00323 filed on Jan. 7, 2004, Date of Mailing May 7, 2004.

\* cited by examiner

*Primary Examiner*—Satya B Sastri
(74) *Attorney, Agent, or Firm*—Turocy & Watson, LLP

(57) ABSTRACT

Tractable metal oxide sols are made by combining at least one metal oxide compound, at least one organofunctional silane, at least one boron oxide compound, and a liquid, or metal oxide sols are made by combining at least one metal oxide compound, at least one organofunctional silane, at least one of an acid catalyst and salt/complex catalyst, and a liquid. Also disclosed are nanocomposites containing the metal oxide sols and at least one of metal nanoparticle, metal-chalcogenide nanoparticle, metal oxide nanoparticle, and metal phosphate nanoparticle. Further disclosed are composites containing a polymer material and at least one of the metal oxide sol and the nanocomposite.

17 Claims, No Drawings

TRACTABLE METAL OXIDE SOLS AND NANOCOMPOSITES THEREFROM

RELATED APPLICATIONS

This application is a continuation-in-part application of U.S. patent application Ser. No. 10/886,143 filed on Jul. 7, 2004 entitled METAL OXIDE SOLS AS NANOSCALE ADDITIVES FOR POLYMERS, now U.S. Pat. No. 7,135,898, which is a continuation-in-part application of U.S. patent application Ser. No. 10/337,624 filed on Jan. 7, 2003 entitled METAL OXIDE SOLS AS NANOSCALE ADDITIVES FOR POLYMERS, now U.S. Pat. No. 6,955,771, all of which are hereby incorporated by reference.

TECHNICAL FIELD

The subject invention generally relates to metal oxide sols, metal oxide sol hosted guest metal nanoparticles, metal oxide sol hosted guest metal-chalcogenide nanoparticles, metal oxide sol hosted guest metal phosphate nanoparticles, metal oxide sol hosted guest metal oxide nanoparticles, and polymers containing the metal oxide sols, polymers containing the metal oxide sol hosted at least one of guest metal nanoparticles, guest metal-chalcogenide nanoparticles, guest metal phosphate nanoparticles, and guest metal oxide nanoparticles, and related methods.

BACKGROUND

In the last century, synthetic polymers have revolutionized the way in which we live. From synthetic rubber used in tires, structural plastic used in transportation systems, to field responsive polymers used in optical and electrical devices, synthetic polymers are used everywhere. A myriad of products and components for products are made, at least in part, of a polymer material. As the uses for polymers continue to increase, it becomes more and more desirable to improve the properties of polymers.

For example, silica, graphite, carbon black, and clay among many other materials have been incorporated into polymers in attempts to improve the properties of the resultant composites. While improvements have been realized, further improvements are desired.

SUMMARY

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The subject invention provides tractable metal oxide sols. The tractable metal oxide sols can be uniformly incorporated into various polymer systems on a molecular level thereby improving one or more of the polymer properties. The subject invention thus also provides polymer systems with one or more of improved strength, improved corona resistance, improved plasma resistance, improved resistance to organic solvents, improved high temperature stability, improved flame retardancy, improved oxidative stability, refractive index modification, improved fracture properties, improved abrasion resistance, improved liquid permeability, improved gas permeability including improved gas permeability to specific gases, improved (low) hysteresis loss (low rolling resistance), and the like. When used with a translucent polymer or translucent glass, the resulting polymer or glass composition remains clear or translucent.

To the accomplishment of the foregoing and related ends, the invention comprises the features hereinafter fully described and particularly pointed out in the claims. The following description sets forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The metal oxide sols may be prepared by mixing certain amounts of at least one metal oxide compound; at least one organofunctional silane; at least one of a boron oxide compound; and a liquid. The metal oxide sols may be prepared by mixing certain amounts of at least one metal oxide compound; at least one organofunctional silane; at least one of a boron oxide compound; at least one catalyst; and a liquid. The metal oxide sols may be prepared by mixing certain amounts of at least one metal oxide compound; at least one organofunctional silane; at least one of an acid catalyst and salt/complex catalyst; and a liquid. Dried metal oxide sols can be prepared by removing the liquid from the metal oxide sol solution. The sols thus prepared may be further treated with a base catalyst to improve their thermal stability and solubility by suppressing gel formation/precipitation.

The nanocomposites contain metal oxide sols, which act as a host and at least one of guest metal nanoparticle such as a noble or non-noble metal nanoparticle, metal-chalcogenide nanoparticle such as noble or non-noble metal-chalcogenide nanoparticle, and metal phosphate nanoparticle such as noble or non-noble metal phosphate nanoparticle. Although not wishing to be bound by any theory, it is believed that the metal oxide sols act as hosts for individual guest metal atoms and clusters of guest metal atoms. Extensive aggregation and/or precipitation of guest metal is thereby mitigated. The host metal oxide sols also play an important role in improving the compatibility of the resulting nanocomposites with polymer materials. The nanocomposites can be stored in a stable manner in liquid/sol solution form or in powder/dry sol form. The nanocomposites are thermally stable, thereby facilitating their use in polymer systems.

The host metal oxide sols contribute to the stability of the nanoparticles; that is, at least partly owing to the presence of the metal oxide sols the nanoparticles are stable over a long period of time, may be stored in a dry state, and are compatible with polymer systems.

The metal oxide sol and the nanocomposite are tractable. That is, the dried metal oxide sol and dried nanocomposite can be stably stored and combined with a liquid to give a substantially clear solution/sol. The dried metal oxide sol and dried nanocomposite may be prepared by removing the liquid phase in the metal oxide sol and nanocomposite at an elevated temperature, to provide a storable, powder form. The metal oxide sol powder and nanocomposite powder may be subsequently recombined with a liquid, to provide a sol solution. The dried metal oxide sol and dried nanocomposite may be prepared by casting the metal oxide sol and nanocomposite at an elevated temperature and may be in a film form. The metal oxide sol film and nanocomposite film are soluble in a liquid.

A "sol", as the term is used herein, refers to a composition containing a liquid colloidal dispersion containing a liquid phase and a dispersed phase. The liquid phase of the liquid colloidal dispersion may be aqueous and/or organic. The liquid phase may also be a liquid or partially liquid substance to which a metal oxide sol can be added, such as resin monomers. For example, in the case where it is desired to incorporate nanocomposites into a polymer, the liquid phase of the metal oxide sols may be constituted by a polymer monomer in liquid form. A "dried sol" or "dried nanocomposite" results when the liquid phase of a sol is removed.

The term "hydrocarbyl" as used herein includes hydrocarbon as well as substantially hydrocarbon groups. Substantially hydrocarbon describes groups which contain heteroatom substituents which do not alter the predominantly hydrocarbon nature of the group. Examples of hydrocarbyl groups include hydrocarbon substituents, i.e., aliphatic (e.g., alkyl or alkenyl) and substituted aliphatic substituents, alicyclic (e.g., cycloalkyl, cycloalkenyl) substituents, aromatic-, aliphatic- and alicyclic-substituted aromatic substituents, fluorocarbon groups, polysiloxanes, and alkylates. Heteroatoms include, by way of example, fluorine, nitrogen, oxygen, silicon, phosphorus, and sulfur.

Metal oxide compounds include a metal and at least one alkoxide group or carboxylate group. Metal oxides include metal methoxides, metal ethoxides, metal isopropoxides, metal propoxides, metal butoxides, metal ethylhexoxides, metal (triethanolaminato)isopropoxides, chelated metal alkoxides such as metal bis(2,4-pentanedionate)diisopropoxides, metal bis(ethyl acetoacetato)diisopropoxides, and metal trifluoroacetylacetonates. Metal oxides also include at least one of transition metal alkoxides, post-transition metal alkoxides, alkali metal alkoxides, and alkaline earth metal alkoxides.

The metal of the metal oxide compounds include at least one transition metal and/or alkaline earth metal and combinations thereof. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, Si, and Po. It is noted that for purposes of this disclosure, Si is a post-transition metal. Alkali metals include Li, Na, K, Rb and Cs. Alkaline earth metals include Be, Mg, Ca, Sr and Ba. In one embodiment, the metal of the metal oxide compound is at least one of aluminum, titanium and zirconium.

Metal oxide compounds are commercially available or can be made from precursor compounds such as transition metal halides, alkaline earth metal halides, post-transition metal halides, alkali metal halides, transition metal carboxylates, alkaline earth metal carboxylates, post-transition metal carboxylates, alkali metal carboxylates, transition metal nitrates, alkaline earth metal nitrates, post-transition metal nitrates, and alkali metal nitrates.

In one embodiment, metal oxide compounds can be represented by Formula I:

$$M_aO_k(OR^1)_b \tag{I}$$

wherein each M is a transition metal, alkaline earth metal, post-transition metal, or alkali metal, each $R^1$ is independently a hydrogen or a hydrocarbyl group containing from 1 to about 18 carbon atoms (at least one $R^1$ is a hydrocarbyl group), a is from 1 to about 5, k is 0 to about 10, and b is from 1 to about 20. In some instances, $R^1$ may be a hydrogen atom provided that at least one or at least two $R^1$s are hydrocarbyl groups containing from 1 to about 8 carbon atoms. In another embodiment, each $R^1$ is independently a hydrocarbyl group containing from 1 to about 6 carbon atoms, a is from 1 to about 4, k is from 0 to about 3, and b is from 1 to about 6. In yet another embodiment, each $R^1$ is independently a hydrocarbyl group containing from 1 to about 4 carbon atoms, a is from 1 to about 3, and b is from 1 to about 4.

Specific examples of metal oxide compounds include aluminum triethoxide, aluminum isopropoxide, aluminum sec-butoxide, aluminum tri-t-butoxide, magnesium trifluoroacetylacetonate, magnesium methoxide, magnesium ethoxide, titanium methoxide, titanium ethoxide, titanium isopropoxide, titanium propoxide, titanium butoxide, titanium ethylhexoxide, titanium (triethanolaminato)isopropoxide, titanium bis(ethyl acetoacetato)diisopropoxide, titanium bis(2,4-pentanedionate)diisopropoxide, zirconium ethoxide, zirconium isopropoxide, zirconium propoxide, zirconium sec-butoxide, zirconium t-butoxide, aluminum di-s-butoxide ethylacetonate, calcium methoxyethoxide, calcium methoxide, magnesium methoxyethoxide, copper ethoxide, copper methoxyethoxyethoxide, antimony butoxide, bismuth pentoxide, chromium isopropoxide, tin ethoxide, zinc methoxyethoxide, titanium n-nonyloxide, vanadium tri-n-propoxide oxide, vanadium triisobutoxide oxide, iron ethoxide, tungsten ethoxide, samarium isopropoxide, lanthanum methoxyethoxide, and combinations of two or more of the above compounds.

Metal hydroxides and metal salts such as metal carboxylates, metal halides, and metal nitrates may also be added as the metal oxide compound to make the metal oxide sols. Metal carboxylates include metal acetates, metal ethylhexanoates, metal gluconates, metal oxalates, metal propionates, metal pantothenates, metal cyclohexanebutyrates, metal bis(ammonium lacto)dihydroxides, metal citrates, and metal methacrylates. The metals are the same metals as the metal alkoxides. Specific examples of metal carboxylates include aluminum lactate, calcium acetate, calcium ethylhexanoate, calcium gluconate, calcium oxalate, calcium propionate, calcium pantothenate, calcium cyclohexanebutyrate, cobalt methoxyethoxide, cobalt acetate, iron acetate, magnesium acetate, magnesium methylcarbonate, magnesium gluconate, nickel acetate, tin acetate, tin oxalate, titanium bis(ammonium lacto)dihydroxide, zinc acetate, zinc methacrylate, zinc stearate, zinc cyclohexanebutyrate, zirconium acetate, and zirconium citrate.

Organofunctional silanes includes compounds represented by Formula II:

$$(R^2)_{4-c}Si(X)_c \tag{II}$$

wherein c is 1 to 3, each X is individually a hydrogen, halogen, acetoxy, amino, hydroxy or an alkoxy group containing from 1 to about 4 carbon atoms, and each $R^2$ is individually an organofunctional containing organic group containing from about 1 to about 24 carbon atoms including at least one from the group consisting of heterocyclic, acryloxy, cyano, phosphino, amino, amide, vinyl, epoxy, glycidoxy, aryl, alkyl, a carbon carbon triple bond containing group, mercapto, siloxy, halocarbon such as fluorocarbon, and a carbon carbon double bond containing group. In another embodiment, c is 2 or 3, X is individually an alkoxy group containing from 1 to about 2 carbon atoms, and each $R^2$ is individually an organofunctional containing organic group containing from about 2 to about 8 carbon atoms.

The organofunctional containing organic group ($R^2$) of the organosilane is selected so that it is compatible with a polymer in which the resultant metal oxide sols or nanocomposites containing the metal oxide sols may be incorporated. Specific examples of heterocyclic groups include substituted and unsubstituted pyrroles, pyrazoles, imidazoles, pyrrolidines, pyridines, pyrimidines, oxazoles, thiazoles, furans, thiophenes, dithianes, and isocyanurates. Specific examples of acryloxy groups include acryloxy, alkylacryloxy groups such as methacryloxy, and the like. Specific examples of carbon carbon double bond containing groups include alkenyl, cyclopentadienyl, styryl, and phenyl.

Examples of organofunctional silanes include phenyltrimethoxysilane; phenyltriethoxysilane; diphenyldimethoxysilane; diphenyldiethoxysilane; 3-aminopropyltrimethoxysilane; 3-aminopropyltriethoxysilane; N-(3-trimethoxysilylpropyl)pyrrole; N-[3-(triethoxysilyl)propyl]-4,5-dihydroimidazole; beta-trimethoxysilylethyl-2-pyridine; N-phenylaminopropyltrimethoxysilane; 3-(N-styrylmethyl-2-aminoethylamino)propyltrimethoxysilane; methacryloxypropenyltrimethoxysilane; 3-methacryloxypropyltrimethoxysilane; 3-methacryloxypropyltris(methoxyethoxy)silane; 3-cyclopentadienylpropyltriethoxysilane; 7-oct-1-enyltrimethoxysilane; 3-glycidoxypropyl-trimethoxysilane; gamma-glycidoxypropylmethyldimethoxysilane; gamma-glycidoxypropylpylpentamethyldisiloxane; gamma-glycidoxypropylmethyldiethoxysilane; gamma-glycidoxypropyldimethylethoxysilane; (gamma-glycidoxypropyl)-bis-(trimethylsiloxy)methylsilane; vinylmethyldiethoxysilane; vinylmethyldimethoxysilane; methylaminopropyltrimethoxysilane; n-octyltriethoxysilane; n-octyltrimethoxysilane; hexyltriethoxysilane; isobutyltrimethoxysilane; 3-ureidopropyltriethoxysilane; 3-isocyanatepropyltriethoxysilane; N-phenyl-3-aminopropyltrimethoxysilane; 3-triethoxysilyl-N-(1,3-dimethyl-butyliden) propylamine; N-2(aminoethyl)-3-aminopropyltriethoxysilane; N-2(aminoethyl)-3-aminopropyltrimethoxysilane; N-2(aminoethyl)-3-aminopropylmethyldimethoxysilane; 3-acryloxypropyltrimethoxysilane; methacryloxypropylmethyldiethoxysilane; methacryloxypropylmethyldimethoxysilane; glycidoxypropylmethyldiethoxysilane; 2-(3,4 epoxycyclohexyl)-ethyltrimethoxysilane; vinyltrimethoxysilane; vinyltriethoxysilane; amonophenyltrimethoxysilane; triethoxysilane; p-chloromethyl)phenyltri-n-propoxysilane; diphenylsilanediol; 2-(3,4-epoxycyclohexyl)ethyltrimethoxysilane; epoxyhexyltriethoxysilane; tris(3-trimethoxysilylpropyl)isocyanurate; dococentyltrimethoxysilane; 3-mercaptopropyltriethoxysilane; 1,4-bis(trimethoxysilylethyl)benzene; phenylsilane; trimethoxysilyl-1,3-dithiane; n-trimethoxysilylpropylcarbamoylcaprolactam; 2-(diphenylphosphine)ethyltriethoxysilane, 3-cyanopropyltrimethoxysilane, diethylphosphatoethyltriethoxysilane, phenyltrichlorosilane, phenyltriacetoxysilane, octyltrichlorosilane, hexyltrichlorosilane, phenylbis(dimethylamino)chlorosilane, trimethylchlorosilane, trimethylbromosilane, hexamethyldisilazane, bis(trimethylsilyl)acetamide, trimethylethoxysilane, t-butyldiphenylchlorosilane, dimethyldichlorosilane and the like.

Organosilanes are commercially available from a number of sources including under the trade designation Prosil® from Clariant and from ShinEtsu among others, or they may be prepared from organosilane precursor compounds such as corresponding halosilanes, such as vinyltrichlorosilane.

Boron oxide compounds contain at least boron and oxygen atoms. Boron oxide compounds include boric acid (B(OH)$_3$), alkoxy boron compounds (or boron alkoxides), hydrocarbyl boric acids, hydrocarbyl hydroxy boron alkoxides, and hydroxy boron alkoxides. In one embodiment, boron oxide compounds can be represented by Formula III:

$$B(OH)_d(OR^3)_{3-d} \quad (III)$$

wherein each $R^3$ is independently a hydrocarbyl group containing from 1 to about 8 carbon atoms, and d is from 0 to about 3. In another embodiment, each $R^3$ is independently a hydrocarbyl group containing from 1 to about 4 carbon atoms, and d is from 1 to about 2. In yet another embodiment, boron oxide compounds can be represented by Formula IV:

$$B(OH)_e(OR^4)_f(R^5)_{3-(e+f)} \quad (IV)$$

wherein each $R^4$ is independently a hydrocarbyl group containing from 1 to about 8 carbon atoms, each $R^5$ is independently a hydrocarbyl group containing from 1 to about 24 carbon atoms, e is from 0 to about 3, and f is from 0 to about 3. In still yet another embodiment, each $R^4$ is independently a hydrocarbyl group containing from 1 to about 4 carbon atoms and each $R^5$ is independently a hydrocarbyl group containing from 1 to about 10 carbon atoms.

Specific examples of boron oxide compounds include boric acid, boron tri-n-butoxide, boron tri-sec-butoxide, boron tri-t-butoxide, boron triisopropoxide, boron tri-n-propoxide, boron trimethoxide, boron triethoxide, hydroxy boron diisopropoxide, hydroxy boron diethoxide, hydroxy boron dimethoxide, hydroxy boron dibutoxide, dihydroxy boron isopropoxide, dihydroxy boron ethoxide, dihydroxy boron methoxide, dihydroxy boron butoxide, phenylboronic acid, 3-acetylphenylboronic acid, 4-acetylphenylboronic acid, 5-chlorothiophene-2-boronic acid, 1,4-phenylenebis(boronic acid), (2-carboxyphenyl)boronic acid, (3-carboxyphenyl)boronic acid, (4-carboxyphenyl)boronic acid, (3,4-methylenedioxyphenyl)boronic acid, 4-methylthio)phenylboronic acid, naphthalene-1-boronic acid, naphthalene-2-boronic acid, 8-quinolineboronic acid, benzothiophene-2-boronic acid, (2-acetylaminophenyl)boronic acid, (3-acetylaminophenyl)boronic acid, 4-acetylaminophenyl)boronic acid, (3-methoxycarbonylphenyl)boronic acid, (4-methoxycarbonylphenyl)boronic acid, (4-methyl-1-naphthalene)boronic acid, and the like.

Boric oxide and boric acids are commercially available. For example, boric acids are available from Aldrich, Acros Organics, and Ryscor Science, Inc. Boron alkoxides and hydroxy boron alkoxides can be synthesized by the dehydration of mixtures of alcohol with boric oxide or boric acid. For example, boric acid and ethanol can be used to synthesize boron triethoxide.

A catalyst is a compound that facilitates the reaction amongst metal oxide compound and organofunctinal silane, and optional boron oxide compound to provide the metal oxide sols. Catalysts may be used in effective amounts, for example, about 0.0001 to about 0.1 mole percent to achieve the desired results. The catalysts used in the preparation of metal oxide sols include the organic and inorganic bases, the organic and inorganic acids, organic and inorganic salts and complexes, metal alkoxides, and metal chelates.

Examples of organic and inorganic base catalysts include alkali metal and alkaline earth metal hydroxides such as sodium hydroxide, potassium hydroxide, and lithium hydroxide, and sodium carbonate, sodium acetate, sodium methylate, sodium hydrogencarbonate, isopropyl amine, sodium phenoxide, potassium carbonate, and ammonia, a compound that decomposes to form ammonia, such as ammonium hydroxide, organic quaternary ammonium hydroxides such as tetramethylammonium hydroxide and tetraethylammonium hydroxide, organic amines such as trialkyl amines (e.g., triethyl amine, pyridine, diazabicyclo[2,2,2,]octane, trialkanolamines such as triethanol amine and diamines, and other organic compounds, such as urea.

Examples of inorganic acid catalyst include mineral acids such as HF, HCl, HBr, HI, $H_2SO_4$, $HNO_3$, $H_3PO_4$, $HBF_4$, $HPF_6$, $HSbF_6$ and the like. Examples of organic acid include aliphatic or aromatic carboxylic acids such as acetic acid, adipic acid, ascorbic acid, aspartic acid, azelaic acid, adenosinephosphoric acid, benzoic acid, formic acid, valeric acid, citric acid, glycolic acid, glutamic acid, cinnamic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid, methyl sulfonic acid, phenylsulfonic acid, toluenesulfonic acid, trifluoroacetic acid, trifluoromethane sulfonic acid, tartaric acid, succinic acid, citric acid trifluoromethylsulfonic acid, and their esters, sulfonated organic polymers or resins, and the like.

Examples of organic and inorganic salt and complex catalysts include those derived from the above mentioned acids and bases such as sodium tetrafluoroborate, sodium hexafluoroferrate, sodium hexafluoroaluminate, sodium hexafluorotitanate, tetraethylammonium p-toluene sulfonate, trifluoroboron-ethylamine, ammonium hydrogen fluoride, tetramethylammonium fluoride, tetraethylammonium hexafluorophosphate, tetraethylammonium hydrogen sulfate, tetraethylammonium trifluoroacetate, tetraethylammoniumtetraborate, 1-fluoropyridinium triflate, 1-fluoropyridinium pyridine heptafluoroborate, and Cyracure UVI 6976 from Dow (sulfonium hexafluoroantimonate).

Metal chelate compounds may be used as a catalyst. Examples of the metal chelate compounds include organic chelate compounds of Al, Ti, Mn, Fe, Co, Ni, Cu, Zn, Ge, In, Sn, Zr, and Hf. Specific examples of the metal chelate catalyst include aluminum bis-ethylacetoacetate monoacetylacetonate, aluminum diacetylacetonate ethyl acetoacetate, aluminum monoacetylacetonate bis-propyl acetoacetate, aluminum monoacetylacetonate bisbutyl acetoacetate, aluminum monoacetylacetonate bishexyl acetoacetate, aluminum monoethyl acetoacetate bispropyl acetoacetonate, aluminum monoethyl acetoacetate bisbutyl acetoacetonate, aluminum monoethylacetoacetate bis-hexyl acetoacetonate, aluminum monoethylacetoacetate bisnonylacetoacetonate, aluminum dibutoxide monoacetoacetate, aluminum dipropoxide monoacetoacetate, aluminum butoxide monoethylacetoacetate, aluminum-s-butoxide bis(ethyl acetoacetate), aluminum di-s-butoxide ethylacetoacetate, aluminum-9-octadecenyl acetoacetate diisopropoxide, titanium allylacetoacetate triisopropoxide, titanium di-n-butoxide (bis-2,4-pentanedionate), titanium diisopropoxide (bis-2,4-pentanedionate), titanium diisopropoxide bis(tetramethylheptanedionate), titanium diisopropoxide bis(ethyl acetoacetate), titanium methacryloxyethylacetoacetate triisopropoxide, titanium oxide bis(pentanedionate), zirconium allylacetoacetate triisopropoxide, zirconium di-n-butoxide (bis-2,4-pentanedionate), zirconium diisopropoxide (bis-2,4-pentanedionate), zirconium diisopropoxide bis(tetramethylheptanedionate), zirconium diisopropoxide bis(ethylacetoacetate), zirconium methacrylicoxyethylacetoacetate triisopropoxide, zirconium butoxide (acetylacetate) (bisethylacetoacetate), and iron acetylacetonate.

In one embodiment, the metal oxide sols are prepared by combining the metal oxide compound, the organofunctional silane, and the boron oxide compound in any suitable order with a liquid such as water and/or an organic solvent. In this connection, the metal oxide compound, the organofunctional silane, and the boron oxide compound may be simultaneously combined; the metal oxide compound and the organofunctional silane may be initially combined, followed by addition of the boron oxide compound; the metal oxide compound and the boron oxide compound may be initially combined, followed by addition of the organofunctional silane; or the boron oxide compound and the organofunctional silane may be initially combined, followed by addition of the metal oxide compound. The presence of boron oxide compound in the reaction solution may allow one to maintain a clear solution throughout the reaction. One or more of any suitable acid catalyst, base catalyst, or salt/complex catalyst in the amount of about less than about 5% by weight may be optionally employed to facilitate the formation of the metal oxide sols.

In one embodiment, the metal oxide sols are prepared by mixing the metal oxide compound, the organofunctional silane, at least one of an acid catalyst and salt/complex catalyst, in any suitable order with a liquid such as water and/or an organic solvent to provide the metal oxide sol. Optionally, the boron oxide compound may be added to the solution at any time.

In one embodiment, the metal oxide sols are prepared by mixing the metal oxide compound, the organofunctional silane, an acid catalyst and/or salt/complex catalyst, in any suitable order with a liquid such as water and/or an organic solvent to provide intermediate sols; and mixing a liquid such as an organic solvent and the base catalyst with the intermediate sol to provide the metal oxide sol having improved thermal stability (improved resistance to gel formation) and solubility. In another embodiment, the intermediate sol is provided by using a weak acid catalyst and the metal oxide sol is provided by using a strong base catalyst. In yet another embodiment, the intermediate sol is provided by using an acid catalyst and the metal oxide sol is provided by using a base catalyst at more than 1 of a molar ratio of base/acid. Optionally, the boron oxide compound may be added to the solution at any time. The presence of boron oxide compound in the reaction solution may allow one to maintain a clear solution throughout the reaction.

In one embodiment, the metal oxide sols are prepared by mixing the metal oxide compound, the organofunctional silane, an acid catalyst and/or salt/complex catalyst, in any suitable order with a liquid such as water and/or an organic solvent to provide intermediate sols; removing the liquid from the intermediate sols; and mixing a liquid such as an organic solvent and the base catalyst with the intermediate sol to provide the metal oxide sol having improved thermal stability (improved resistance to gel formation) and solubility. When a volatile acid catalyst is employed, the volatile acid catalyst is removed at an elevated temperature. Optionally, the boron oxide compound may be added to the solution at any time. The presence of boron oxide compound in the reaction solution may allow one to maintain a clear solution throughout the reaction.

A catalytically effective amount of the catalyst is used to provide the intermediate sol and metal oxide sol. In one embodiment, the catalyst is used in the amount of from about 0.001% by weight to about 5% by weight of the reaction solution. In another embodiment, the catalyst is used in the amount of from about 0.03% by weight to about 3% by weight of the reaction solution. In yet another embodiment, the catalyst is used in the amount of from about 0.05% by weight to about 1% by weight of the reaction solution.

After the intermediate sol is prepared by mixing the metal oxide compound, the organofunctional silane, the acid catalyst and/or salt/complex catalyst with the liquid, the liquid may be removed from the intermediate sols to provide a dried intermediate sol. In one embodiment, the intermediate sol is subject to an evaporation technique, with optional heating, to remove the liquids present. A vacuum may be employed to facilitate removal of the liquids. The resultant dry metal oxide sol may be in a powder-like form.

The dried intermediate sol is combined with and dissolved in a liquid such as an organic solvent at a temperature suitable to facilitate dissolving and mixed with the base catalyst to provide the metal oxide sol. In one embodiment, the temperature while dissolving the dried intermediate sol is maintained from about 20° C. to about 250° C. In another embodiment, the temperature while dissolving the dried intermediate sol is maintained from about 30° C. to about 150° C. During the base catalyzed condensation of the intermediate sol, water byproduct can be removed azeotropically or by use of vacuum to facilitate the completion of the reaction.

The liquid is at least one of water and an organic solvent. In one embodiment, the metal oxide compound, organofunctional silane, and boron oxide compound are combined in a mixture of water and at least one organic solvent. In another embodiment, the metal oxide compound, organofunctional silane, and boron oxide compound are combined in an organic solvent, followed by addition of water. Regardless of the liquid protocol, a certain minimum amount of water is desirably provided to facilitate formation of stable sols.

The following general equations illustrate exemplary preparation methods of metal oxide sols (although it is understood that not every possible permutation is listed):
   (1) M+Si→intractable sol (insoluble after drying)
   (2) M+Si+Base C→intractable sol (insoluble after drying)
   (3) M+Si+B→tractable sol (clear solution)
   (4) M+Si +B+C→tractable sol (clear solution)
   (5) M+Si+Acid C→intermediate sol
   Intermediate sol+Base C→tractable sol (clear solution)

wherein M=metal oxide compound, Si=organofunctional silane, C=catalyst, and B=boric oxide compound.

The minimum amount of water, in moles, can be determined based on the empirical equation of the sol formation. More specifically, in one embodiment, representing the reaction as follows:

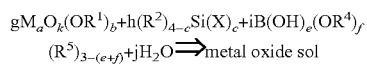
$$gM_aO_k(OR^1)_b + h(R^2)_{4-c}Si(X)_c + iB(OH)_e(OR^4)_f$$
$$(R^5)_{3-(e+f)} + jH_2O \Rightarrow \text{metal oxide sol}$$

where M, $R^1$, $R^2$, $R^4$, $R^5$, X, a, b, c, e, f, and k are as defined above, and g, h, i, and j are the number of moles of each component. The minimum amount of water, and thus j, is determined using the following equation: (gb+hc+if)/2. That is, in the above reaction, j≧(gb+hc+if)/2. In another embodiment, j>(gb+hc+if)/2. This minimum amount of water is referred to as a sol facilitating amount of water. The water may be added when combining the metal oxide compound, organosilane, and boron oxide compound with an organic solvent, or when combining the metal oxide compound, organosilane, and boron oxide compound with a polymer, or just after combining the three components with a polymer. Certain relative amounts of the metal oxide compound, organofunctional silane, and optional boron oxide compound are combined in order to facilitate the formation of stable metal oxide sols.

In one embodiment, from about 10 mole % to about 80 mole % of the metal oxide compound, from about 5 mole % to about 70 mole % of the organofunctional silane, and from about 1 mole % to about 80 mole % of the boron oxide compound may be added to the solution. In another embodiment, from about 13 mole % to about 75 mole % of the metal oxide compound, from about 7 mole % to about 65 mole % of the organofunctional silane, and from about 3 mole % to about 75 mole % of the boron oxide compound may be added to the solution. In yet another embodiment, from about 15 mole % to about 70 mole % of the metal oxide compound, from about 10 mole % to about 60 mole % of the organofunctional silane, and from about 5 mole % to about 70 mole % of the boron oxide compound may be added to the solution.

In one embodiment, from about 10% to about 80% by weight of the metal oxide compound, from about 10% to about 60% by weight of the organofunctional silane, and from about 0.5% to about 80% by weight of the boron oxide compound may be added to the solution. In another embodiment, from about 15% to about 75% by weight of the metal oxide compound, from about 13% to about 55% by weight of the organofunctional silane, and from about 0.7% to about 75% by weight of the boron oxide compound may be added to the solution. In yet another embodiment, from about 20% to about 70% by weight of the metal oxide compound, from about 15% to about 50% by weight of the organofunctional silane, and from about 1% to about 70% by weight of the boron oxide compound may be added to the solution.

In one embodiment, from about 10% to about 80% by weight of the metal oxide compound, from about 10% to about 60% by weight of the organofunctional silane, and an effective amount of at least one of an acid catalyst and salt/complex catalyst may be added to the solution. In another embodiment, from about 15% to about 75% by weight of the metal oxide compound, from about 13% to about 55% by weight of the organofunctional silane, and an effective amount of at least one of an acid catalyst and salt/complex catalyst may be added to the solution. In yet another embodiment, from about 20% to about 70% by weight of the metal oxide compound, from about 15% to about 50% by weight of the organofunctional silane, and an effective amount of at least one of an acid catalyst and salt/complex catalyst may be added to the solution.

One or more of any suitable organic solvent may be employed to combine the metal oxide compound, organofunctional silane, and optional boron oxide compound to provide the metal oxide sol. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like.

The metal oxide compound, organofunctional silane, optional boron oxide compound, and optional catalyst are combined with water and/or an organic solvent at a temperature suitable to facilitate mixing and/or the formation of the metal oxide sols. In one embodiment, the temperature while combining components is maintained from about 15° C. to about 150° C. In another embodiment, the temperature while combining components is maintained from about 20° C. to about 90° C.

The metal oxide sol may be prepared by combining at least two above-mentioned metal oxide sols, at least three above-mentioned metal oxide sols, and so on. In one embodiment, the metal oxide sol is prepared by mixing two metal oxide sols in a wet state. In another embodiment, the metal oxide sol is prepared by mixing a metal oxide sol in a wet state and a metal oxide sol in a dry state. In yet another embodiment, the metal oxide sol is prepared by mixing two metal oxide sols in a dry state and a liquid.

When a boron oxide compound is added to the solution to prepare the metal oxide sol, the boron oxide compound can be removed once the metal oxide sol is prepared. A metal oxide sol without boron oxide compound also can be used as a host for metal nanoparticles. If desired, the boron oxide can be removed from the metal oxide sol anytime after making the metal oxide sol. The boron oxide compound can be removed by various methods. For example, boric acid can be removed by treating the solution with methanol to form volatile methylborate.

The metal oxide sols may be stored in a wet or dry state. In the wet state, the metal oxide compound, organofunctional silane, boron oxide compound, optional catalyst, and organic solvent and/or water are simply stored in a container. In another embodiment, the metal oxide sols made by mixing the metal oxide compound, the organofunctional silane, the acid catalyst and/or salt/complex catalyst, and a liquid to provide an intermediate sol, removing the liquid from the intermediate sol, and mixing a liquid and the base catalyst with the intermediate sol are simply stored in a container.

When storage in a wet state is employed, delivery and movement of the metal oxide sols is facilitated by minimizing the amount of liquid. In one embodiment, the metal oxide sols may be stored in a stable wet state for at least about 12 months. In another embodiment, the metal oxide sols may be stored in a stable wet state for at least about 24 months. In yet another embodiment, the metal oxide sols may be stored in a stable wet state for at least about 36 months.

When storing in a dry state, the metal oxide sol in the wet state are subject to an evaporation technique, with optional heating, to remove the liquids present. A vacuum may be employed. The resultant dry metal oxide sol is in a stable powder-like form. In one embodiment, the metal oxide sol may be stored in a stable dry state for at least about 12 months. In another embodiment, the metal oxide sol may be stored in a stable dry state for at least about 24 months. In yet another embodiment, the metal oxide sols may be stored in a stable dry state for at least about 36 months.

In one embodiment, the dried metal oxide sol contains from about 10% to about 80% by weight of the metal oxide compound and from about 10% to about 60% by weight of the organofunctional silane. Optionally, the dried metal oxide sols also contain from about 0.5% to about 80% by weight of the boron oxide compound. In another embodiment, the dried metal sols contain from about 15% to about 75% by weight of the metal oxide compound and from about 13% to about 55% by weight of the organofunctional silane. Optionally, the dried metal oxide sols also contain from about 0.7% to about 75% by weight of the boron oxide compound. In yet another embodiment, the dried metal oxide sols contain from about 20% to about 70% by weight of the metal oxide compound and from about 15% to about 50% by weight of the organofunctional silane. Optionally, the dried metal oxide sols also contain from about 1% to about 70% by weight of the boron oxide compound.

In one embodiment, the dried metal oxide sol contains less than about 0.5% by weight water. In another embodiment, the dried metal oxide sol contains less than about 0.1% by weight water. In yet another embodiment, the dried metal oxide sol contains less than about 0.05% by weight water.

When storing in a dry state, the dried metal oxide sol can be heated up to about 200° C. for about 2 hours without degradation. Also when storing in a dry state, the dried metal oxide sol can be stored in at least a semi-airtight container, although this is not necessary. Due to the stability of the metal oxide sols, an advantage is that they may be stored in the open air without degradation. This is because it is believed that the metal oxide sol resists water uptake and/or is stable to oxidation. It is another alternative to store the dried sol in an airtight container or in a vacuum pack/state.

Various blends of metal oxide sol nanoparticles can be prepared by treating a mixture of metal oxide precursors as well as combining metal oxide sols in a solution or polymer melt. At least one of guest metal nanoparticle, guest metal-chalcogenide nanoparticle, metal phosphate nanoparticle, guest metal oxide nanoparticle, and precursors of these guest nanoparticles may be combined with the metal oxide sol, or combined with one or more of the metal oxide compound, organofunctional silane, optional boron oxide compound, optional catalyst, water and/or an organic solvent during formation of the metal oxide sol in any suitable order to provide the nanocomposites containing the host metal oxide sol and at least one of guest metal nanoparticle, guest metal-chalcogenide nanoparticle, metal phosphate nanoparticle, guest metal oxide nanoparticle, and precursors of these guest nanoparticles.

For example, at least one of guest metal nanoparticle, guest metal-chalcogenide nanoparticle, metal phosphate nanoparticle, guest metal oxide nanoparticle, and precursors of these guest nanoparticles may be simultaneously combined with the metal oxide compound, the organofunctional silane, and the boron oxide compound; the metal oxide compound, the organofunctional silane, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles, and further followed by adding the boron oxide compound; the metal oxide compound, the organofunctional silane, the boron oxide compound, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles; the metal oxide compound, at least one of guest metal nanoparticle, guest metal-chalcogenide nanoparticle, metal phosphate nanoparticle, guest metal oxide nanoparticle, and precursors of these guest nanoparticles and the liquid are initially combined, followed by adding the organofunctional silane; the metal oxide compound, at least one of guest metal nanoparticle, guest metal-chalcogenide nanoparticle, metal phosphate nanoparticle, guest metal oxide nanoparticle, and precursors of these guest nanoparticles are initially combined, followed by adding boron oxide compound, and further followed by adding the organofunctional silane. Optionally, a catalyst may be added to the solution at any time. The presence of a catalyst in the reaction solution may allow one to maintain a clear solution throughout the reaction.

For further example, at least one of guest metal nanoparticle, guest metal-chalcogenide nanoparticle, metal phosphate nanoparticle, guest metal oxide nanoparticle, and precursors of these guest nanoparticles may be simultaneously combined with the metal oxide compound, the organofunctional silane, and at least one of an acid catalyst and salt/complex catalyst; the metal oxide compound, the organofunctional silane, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles, and further followed by adding at least one of an acid catalyst and salt/complex catalyst; the metal oxide compound, the organofunctional silane, at least one of an acid catalyst and salt/complex catalyst, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles; the metal oxide compound, at least one of guest metal nanoparticle, guest metal-chalcogenide nanoparticle, metal phosphate nanoparticle, guest metal oxide nanoparticle, and precursors of these guest nanoparticles and the liquid are initially combined, followed by adding the organofunctional silane; the metal oxide compound, at least one of guest metal nanoparticle, guest metal-chalcogenide nanoparticle, metal phosphate nanoparticle, guest metal oxide nanoparticle, and precursors of these guest nanoparticles are initially combined, followed by adding at least one of an acid catalyst and salt/complex catalyst, and further followed by adding the organofunctional silane. Optionally, a boron oxide compound may be added to the solution at any time.

For still further example, at least one of guest metal nanoparticle, guest metal-chalcogenide nanoparticle, metal phosphate nanoparticle, guest metal oxide nanoparticle, and precursors of these guest nanoparticles may be simultaneously combined with the metal oxide compound, the organofunctional silane, the liquid, and the acid catalyst and/or salt/complex catalyst to provide a intermediate sol, removing the liquid from the intermediate sols, dissolving the dried intermediate sols in a liquid, and mixing the intermediate sol solution with the base catalyst to provide the metal oxide sol; the metal oxide compound, the organofunctional silane, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles, and further followed by adding the acid catalyst and/or salt/complex catalyst to provide a intermediate sol, removing the liquid from the intermediate sols, dissolving the dried intermediate sols in a liquid, and mixing the intermediate sol solution with the base catalyst to provide the metal oxide sol; the metal oxide compound, the organofunctional silane, the acid catalyst and/or salt/complex catalyst, and the liquid are initially combined, followed by adding at least one of guest metal nanoparticle, guest metal-chalcogenide nanoparticle, metal phosphate nanoparticle, guest metal oxide nanoparticle, and precursors of these guest nanoparticles to provide a intermediate sol, removing the liquid from the intermediate sols, dissolving the dried intermediate sols in a liquid, and mixing the intermediate sol solution with the base catalyst to provide the metal oxide sol; the metal oxide compound, at least one of guest metal nanoparticle, guest metal-chalcogenide nanoparticle, metal phosphate nanoparticle, guest metal oxide nanoparticle, and precursors of these guest nanoparticles, the acid catalyst and/or salt/complex catalyst, and the liquid are initially combined, followed by adding the organofunctional silane to provide a intermediate sol, removing the liquid from the intermediate sols, dissolving the dried intermediate sols in a liquid, and mixing the intermediate sol solution with the base catalyst to provide the metal oxide sol; mixing the metal oxide compound, the organofunctional silane, the liquid, and the acid catalyst and/or salt/complex catalyst to provide a intermediate sol, adding at least one of guest metal nanoparticle, guest metal-chalcogenide nanoparticle, metal phosphate nanoparticle, guest metal oxide nanoparticle, and precursors of these guest nanoparticles to the intermediate sol, removing the liquid from the intermediate sols, dissolving the dried intermediate sols in a liquid, and mixing the intermediate sol solution with the base catalyst to provide the metal oxide sol; mixing the metal oxide compound, the organofunctional silane, the liquid, and the acid catalyst and/or salt/complex catalyst to provide a intermediate sol, removing the liquid from the intermediate sols, dissolving the dried intermediate sols in a liquid, adding at least one of guest metal nanoparticle, guest metal-chalcogenide nanoparticle, metal phosphate nanoparticle, guest metal oxide nanoparticle, and precursors of these guest nanoparticles to the intermediate sol, and mixing the intermediate sol solution with the base catalyst to provide the metal oxide sol; mixing the metal oxide compound, the organofunctional silane, the liquid, and the acid catalyst and/or salt/complex catalyst to provide a intermediate sol, dissolving the dried intermediate sols in a liquid, mixing the intermediate sol solution with the base catalyst to provide the metal oxide sol, and adding at least one of guest metal nanoparticle, guest metal-chalcogenide nanoparticle, metal phosphate nanoparticle, guest metal oxide nanoparticle, and precursors of these guest nanoparticles to the metal oxide sol. Optionally, the boron oxide compound may be added to the solution at any time. The presence of boron oxide compound in the reaction solution may allow one to maintain a clear solution throughout the reaction. Optionally, a catalyst may be added to the solution at any time. The presence of a catalyst in the reaction solution may allow one to maintain a clear solution throughout the reaction.

The use of chelating compounds can effectively help control the particle size of guest metal nanoparticle, the guest metal-chalcogenide nanoparticle, guest metal phosphate nanoparticle, and/or guest metal oxide nanoparticle. Chelating compounds include silanes having a chelating group such as mercapto, amino, cyano, amide, phosphino, or heterocyclic group and non-silane chelating compounds such as alkylthiols, arylthiols, alkylamines, arylamines, alkylcarboxylic acids, arylcarboxylic acids, arylphosphines, alkylphosphines, and the like. Chelating compounds can be added during the preparation of host metal oxide sols or host-guest metal oxide sols.

Generally speaking, the metal nanoparticle precursors fall into two groups; namely, 1) noble metal ions and 2) zero valence noble and non-noble metals. Although more fully described elsewhere, examples of noble metal ions include gold hydroxide and silver acetate. Noble metal ions can be reduced to form metal nanoparticles by heat, UV exposure, and reducing agents (such as phenylsilane, hydrogen gas, etc.). Examples of zero valence noble and non-noble metals include metal carbonyls and metal olefins. Zero valence noble and non-noble metals can release ligands and form metal clusters/nanoparticles by application of heat, for example. Non-noble metal ions can form metal chalcogenide nanoparticles after incorporation into a host sol and treated with a chalcogenizing agent. Specific examples of non-noble metal ions include cadmium acetate and lead acetate.

While metal nanoparticle precursors are converted to metal nanoparticles, which can be then converted to metal-chalcogenide nanoparticles, metal phosphate nanoparticles, or metal oxide nanoparticles (generally when the metal nanoparticle precursors are zero valence noble and non-noble metals); metal nanoparticle precursors may be directly converted to metal-chalcogenide nanoparticles, metal phosphate nanoparticles, or metal oxide nanoparticles (generally when the metal nanoparticle precursors are noble metal ions).

Generally speaking, high level examples of making the metal chalcogenide nanoparticles include one or more of the following three general and specific reaction routes.

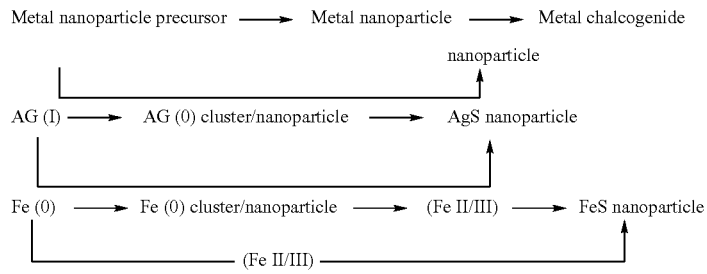

Guest metal nanoparticle precursors may include zero valence metal (e.g., metal carbonyls, metal olefins) and noble metal ions (e.g., metal alkoxide, metal oxides, metal hydroxides, metal carboxylates, metal nitrates, metal halides, metal cyanides, chelated metals). Examples of metals include gold, silver, platinum, palladium, ruthenium, copper, rhodium, technetium, osmium, iron, cobalt, zinc, vanadium, chromium, manganese, rhenium, nickel, iridium, and tungsten. Examples of guest metal nanoparticle precursors include gold hydroxide, gold acetate, gold chloride, silver acetate, silver acetylacetonate, silver citrate, silver lactate, silver nitrate, platinum acetylacetonate, platinum chloride, palladium acetylacetonate, palladium acetate, palladium hydroxide, ruthenium acetylacetonate, copper acetate, copper ethoxide, $Fe(CO)_5$, $Fe_2(CO)_9$, $Co_2(CO)_8$, $ZnX(CO)Y$, $V(CO)_6$, $Cr(CO)_6$, $Mn_2(CO)_{10}$, $Re_2(CO)_{10}$, $Ru_3(CO)_{12}$, $Mo(CO)_6$, $Ni(CO)_4$, $Os(CO)_5$, $Os_3(CO)_{12}$, $Ir_4(CO)_{12}$, $W(CO)_6$, $Tc_2(CO)_{10}$, $Ru(CO)_5$, $Rh(CO)_{12}$, $Pd(CO)_4$, $Pt(CO)_4$, platinum-1,3-divinyl-1,1,3,3,-tetramethyldisiloxane, and the like.

Examples for metal-chalcogenide nanoparticle precursors, metal phosphate nanoparticle precursors, and metal oxide nanoparticle precursor include, in addition to the metal nanoparticle precursors listed above, iron hydroxide, cobalt hydroxide, zinc hydroxide, nickel hydroxide, cadmium hydroxide, iron acetate, cobalt acetate, zinc acetate, chromium acetate hydroxide, manganese acetate, molybdenum acetate, nickel acetate, lead acetate, cadmium acetate, iron chloride, cobalt chloride, zinc chloride, vanadium chloride, chromium chloride, manganese chloride, molybdenum chloride, nickel chloride, lead chloride, cadmium chloride, niobium chloride, tungsten chloride, iron acetylacetonate, cobalt acetylacetonate, zinc acetylacetonate, vanadyl acetylacetonate, chromium acetylacetonate, manganese acetylacetonate, molybdenum acetylacetonate, nickel acetylacetonate, lead acetylacetonate, cadmium acetylacetonate, niobium acetylacetonate, iron citrate, cobalt citrate, zinc citrate, nickel citrate, lead citrate, iron nitrate, cobalt nitrate, zinc nitrate, chromium nitrate, manganese nitrate, nickel nitrate, lead nitrate, cadmium nitrate, iron ethoxide, cobalt ethoxide, zinc ethoxide, vanadium ethoxide, chromium ethoxide, manganese ethoxide, molybdenum ethoxide, nickel ethoxide, lead ethoxide, cadmium ethoxide, niobium ethoxide, tungsten ethoxide, cerium methoxyethoxide, erbium acetate, europium acetoacetate, gallium ethoxide, hafnium n-butoxide, indium methoxyethoxide, strontium acetate, tantalum n-butoxide, yttrium acetate, tin acetoacetate, lithium isopropoxide, calcium methoxyethoxide, magnesium methoxyethoxide, tinisopropoxide, aluminum s-butoxide, titanium isopropoxide, vanadium tri-isopropoxide oxide, and zirconium n-butoxide.

Metal-chalcogenide nanoparticles may include noble or non-noble metal-chalcogenide nanoparticles. Examples of metal-chalcogenide nanoparticles may contain AuS, AuSe, AuTe, AgS, AgSe, AgTe, PtS, PtSe, PtTe, PdS, PdSe, PdTe, IrS, IrSe, IrTe, ReS, ReSe, ReTe, HgS, HgSe, HgTe, RuS, RuSe, RuTe, RhS, RhSe, RhTe, CuS, CuSe, CuTe, OsS, OsSe, OsTe, FeS, FeSe, FeTe, CoS, CoSe, CoTe, VS, VSe, VTe, CrS, CrSe, CrTe, MnS, MnSe, MnTe, MoS, MoSe, MoTe, NiS, NiSe, NiTe, ZnS, ZnSe, ZnTe, CdS, CdSe, CdTe, NbS, NbSe, NbTe, TcS, TcSe, TcTe, WS, WSe, WTe, SbS, SbSe, SbTe, BaS, BaSe, BaTe, EuS, EuSe, EuTe, GdS, GdSe, GdTe, GaS, GaSe, GsTe, InS, InSe, InTe, LaS, LaSe, LaTe, PbS, PbSe, PbTe, NdS, NdSe, NdTe, PrS, PrSe, PrTe, SmS, SmSe, SmTe, SrS, TaS, TaSe, TaTe, SrSe, SrTe, TaS, TaSe, TaTe, SnS, SnSen SnTe, YbS, YbSe, YbTe, YS, YSe, and YTe.

Metal oxide nanoparticles may include noble or non-noble metal oxide nanoparticles. The plurality of metal oxide nanoparticles has a chemical structure of the form MxOy, where x and y are integers. Examples of the metal element of M include a metal element selected from the IIIA, IIIB, IVA, IVB, VA, VB, VIA, VIIA, VIII and IIB groups in the periodic table. Specific examples of metal oxide nanoparticles include $Ac_2O_3$, $Ag_2O$, $AgO$, $Al_2O_3$, $As_2O_3$, $As_2O_5$, $Au_2O_3$, $BaO$, $BaO_2$, $BeO$, $Bi_2O_3$, $CaO$, $CdO$, $CeO_2$, $CoO$, $CO_3O_4$, $Cr_2O_3$, $CrO_3$, $Cs_2O$, $Cs_2O_2$, $Cs_2O_3$, $Cu_2O$, $CuO$, $EuO$, $FeO$, $Fe_3O_4$, $Fe_2O_3$, $Ga_2O_3$, $GdO$, $GeO_2$, $HfO_2$, $HgO$, $In_2O_3$, $Ir_2O_3$, $IrO_2$, $KO_2$, $La_2O_3$, $Li_2O$, $MgO$, $MnO$, $Mn_3O_4$, $Mn_2O_3$, $MnO_2$, $MoO_2$, $MoO_3$, $Na_2O$, $Na_2O_2$, $NbO$, $NbO_2$, $Nb_2O_5$, $Nd_2O_3$, $NiO$, $NpO_2$, $OsO_2$, $OsO_4$, $PbO$, $Pb_3O_4$, $PbO_2$, $PdO$, $PoO_2$, $Pr_2O_3$, $PtO_2$, $PuO$, $Pu_2O_3$, $PuO_2$, $Rb_2O$, $ReO_2$, $ReO_2$, $ReO_3$, $Rh_2O_3$, $RuO_2$, $Sb_2O_3$, $Sc_2O_3$, $SeO_2$, $Sm_2O_3$, $SnO$, $SnO_2$, $SrO$, $SrO_2$, $Ta_2O_5$, $TeO_2$, $TiO_2$, $Ti_2O_3$, $UO_2$, $VO$, $V_2O_3$, $VO_2$, $V_2O_5$, $WO3$, $Y_2O_3$, $Yb_2O_3$, $ZnO$, and $ZrO_2$.

Metal phosphate nanoparticles generally comprise a phosphate and either a monoatomic metal cation or a polyatomic metal cation. A "phosphate", as the term is used herein, refers to orthophosphates, pyrophosphates, metaphosphates and polyphosphates. The metal component of the metal phosphate nanoparticles can include Group IIA metals, Group IIIA metals, Group IVB metals, and Group VIII metals. As used herein, the Group IIA metals comprise the alkaline earth metals of beryllium, magnesium, calcium, strontium, and barium; the Group IIIA metals comprise aluminum, gallium, indium, and thallium; the Group IVB metals comprise titanium, zirconium and hafnium; and the Group VIII metals comprise iron, cobalt, nickel, ruthenium, rhodium, palladium, osmium, iridium and platinum.

Specific examples of metal phosphate nanoparticles include lithium phosphate ($LiPO_3$, $Li_3PO_4$), sodium phosphate ($NaPO_3$, $Na_3PO_4$, $Na_4P_2O_7$), potassium phosphate ($K_3PO_4$), magnesium phosphate ($Mg(PO_3)_2$, $Mg_3(PO_4)_2$, $Mg_2P_2O_7$), calcium phosphate ($Ca_3(PO_4)_2$, $Ca(PO_3)_2$, $Ca_2P_2O_7$), barium phosphate ($Ba(PO_3)_2$, $Ba_3(PO_4)_2$, $BaPO_3$, $Ba_2P_2O_7$), cadmium phosphate ($Cd_3(PO_4)_2$, $Cd_2P_2O_7$), chromium phosphate ($Cr_4(P_2O_7)_3$), manganese phosphate ($Mn_3$ $(PO_4)_2$, $Mn_2P_2O_7$), molybdenum phosphate ($Mo(PO_3)_4$), platinum phosphate ($PtP_2O_7$), silver phosphate ($AgPO_3$, $Ag_3PO_4$, $Ag_4P_2O_7$), aluminum phosphate ($AlPO_4$, $Al(PO_3)_3$), thallium phosphate ($Tl_3PO_4$), tin phosphate ($Sn_3(PO_4)_2$, $Sn(PO_3)_2$, $Sn_2P_2O_7$), lead phosphate ($Pb_2(PO_4)_2$, $Zn_2P_2O_7$), zinc phosphate ($Zn_3(PO_4)_2$, $Zn_2P_2O_7$), bismuth phosphate ($BiPO_4$), cobalt phosphate ($CO_3(PO_4)_2$), lanthanum phosphate ($LaPO_4$), cerium phosphate ($CePO_4$, $Ce(PO_3)_3$), praseodymium phosphate ($PrPO_4$), neodymium phosphate ($NdPO_4$), samarium phosphate ($SmPO_4$), yttrium phosphate ($YPO_4$), erbium phosphate ($ErPO_4$), thorium phosphate ($Th(PO_3)_4$), nickel phosphate $Ni_3(PO_4)_2$), titanium phosphate ($TiPO_4$), chromium phosphate ($CrPO_4$), iron phosphate ($FePO_4$, $Fe_3(PO_4)_2$), $Zn_2Fe(PO_4)_2$, $Zn_2Ni(PO_4)_2$, $Zn_2Mn(PO_4)_2$, $Mn_2Fe(PO_4)_2$, $Zn_2Ca(PO_4)_2$, $Li_3FePO_4$, and $Li_3V_2(PO_4)_3$.

In one embodiment, from about 10% to about 80% by weight of at least one metal oxide compound, from about 10% to about 60% by weight of at least one organofunctional silane, from about 0.5% to about 80% by weight of at least one boron oxide compound, or an effective amount of at least one of an acid catalyst and salt/complex catalyst, a liquid, and from about 0.001% to about 80% by weight of at least one of guest metal nanoparticle, guest metal-chalcogenide nanoparticle, metal phosphate nanoparticle, guest metal oxide nanoparticle, and precursors of these guest nanoparticles are combined to form the host-guest metal oxide sol nanocomposite. In another embodiment, from about 15% to about 75% by weight of at least one metal oxide compound, from about 13% to about 55% by weight of at least one organofunctional silane, from about 0.7% to about 75% by weight of at least one boron oxide compound, or an effective amount of at least one of an acid catalyst and salt/complex catalyst, a liquid, and from about 0.005% to about 80% by weight of at least one of guest metal nanoparticle, guest metal-chalcogenide nanoparticle, metal phosphate nanoparticle, guest metal oxide nanoparticle, and precursors of these guest nanoparticles are combined to form the host-guest metal oxide sol nanocomposite. In yet another embodiment, from about 20% to about 70% by weight of at least one metal oxide compound, from about 15% to about 50% by weight of at least one organofunctional silane, from about 1% to about 70% by weight of at least one boron oxide compound, or an effective amount of at least one of an acid catalyst and salt/complex catalyst, a liquid, and from about 0.01% to about 80% by weight of at least one of guest metal nanoparticle, guest metal-chalcogenide nanoparticle, metal phosphate nanoparticle, guest metal oxide nanoparticle, and precursors of these guest nanoparticles are combined to form the host-guest metal oxide sol nanocomposite.

In one embodiment, from about 20% to about 99.999% by weight of the metal oxide sols and from about 0.001% to about 80% by weight of at least one of the guest metal nanoparticle, guest metal-chalcogenide nanoparticle, metal phosphate nanoparticle, guest metal oxide nanoparticle, and precursors of these guest nanoparticles are combined to form the host-guest metal oxide sol nanocomposite. In another embodiment, from about 50% to about 99.995% by weight of the metal oxide sols and from about 0.005% to about 50% by weight of at least one of the guest metal nanoparticle, guest metal-chalcogenide nanoparticle, metal phosphate nanoparticle, guest metal oxide nanoparticle, and precursors of these guest nanoparticles are combined to form the host-guest metal oxide sol nanocomposite. In yet another embodiment, from about 80% to about 99.99% by weight of the metal oxide sols and from about 0.01% to about 20% by weight of at least one of the guest metal nanoparticle, guest metal-chalcogenide nanoparticle, metal phosphate nanoparticle, guest metal oxide nanoparticle, and precursors of these guest nanoparticles are combined to form the host-guest metal oxide sol nanocomposite.

The nanocomposites containing the host metal oxide sols and guest metal oxide nanoparticle can be prepared by oxidizing the host guest metal oxide sols containing the host metal oxide sols and at least one of guest metal oxide nanoparticle precursors and guest metal nanoparticles. The guest metal oxide nanoparticle precursors and/or guest metal nanoparticles in the host-guest metal oxide sols may be oxidized to provide the nanocomposites containing the host metal oxide sols and guest metal oxide nanoparticles.

The host-guest metal oxide sols may be treated with an oxidizing agent at ambient temperature or at elevated temperatures to provide the metal oxide nanocomposites. Examples of oxidation agents include an oxygen containing gas such as oxygen and air, ozone, hydrogen peroxide, sodium or potassium permanganate, sodium or potassium bichromate, and manganese peroxide.

The oxidation treatment may be carried out either in solution form or in powder form of host-guest metal oxide sols. In one embodiment, the host-guest metal oxide sols in a wet state may be subject to oxidation treatment. The host-guest metal oxide sols may be dissolved in a liquid. The liquid may be water and/or an organic solvent. In one embodiment, the host-guest metal oxide sols are dissolved in an organic solvent. In another embodiment, the host-guest metal oxide sols are dissolved in a mixture of water and at least one organic solvent. In another embodiment, the host-guest metal oxide sols are dissolved in water, followed by addition of an organic solvent. In yet another embodiment, the host-guest metal oxide sols are dissolved in an organic solvent, followed by addition of water.

One or more of any suitable organic solvent may be employed to dissolve the host-guest metal oxide sols for the oxidation. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like.

The host-guest metal oxide sols may be dissolved for the oxidation in water and/or an organic solvent at a temperature suitable to facilitate dissolving. In one embodiment, the temperature while dissolving the host-guest metal oxide sols is maintained from about 20° C. to about 250° C. In another embodiment, the temperature while dissolving the host-guest metal oxide sols is maintained from about 30° C. to about 150° C.

The host-guest metal oxide sols solution may be treated with an oxidation agent. In one embodiment, oxidation agent gas may be bubbled through the solutions. In another embodiment, the host-guest metal oxide sols solution may be combined with oxidation agent solution.

The oxidation treatment may be carried out in powder form of host-guest metal oxide sol. The host-guest metal oxide sols powder may be exposed to an oxidation agent. In one embodiment, the host-guest metal oxide sol powder may be exposed to an oxidation agent gas.

The oxidation treatment may be carried out at a temperature suitable to facilitate oxidation. In one embodiment, the oxidation treatment is carried out at an ambient temperature. In another embodiment, the temperature during oxidation is maintained from about 10° C. to about 150° C. In another embodiment, the temperature during oxidation is maintained from about 15° C. to about 90° C.

The nanocomposites containing the host metal oxide sols and guest metal-chalcogenide nanoparticle can be prepared by chalcogenizing the host-guest metal oxide sols containing the host metal oxide sols and at least one of the guest metal-chalcogenide precursors, guest metal nanoparticles, and guest metal oxide nanoparticles. The guest metal-chalcogenide precursors, guest metal nanoparticles, and guest metal oxide nanoparticles in the host-guest metal oxide sols may be chalcogenized to provide the nanocomposites containing the host metal oxide sols and guest metal-chalcogenide nanoparticles.

The host-guest metal oxide sols may be treated with a chalcogenizing agent at ambient temperature or at elevated temperatures to provide the metal-chalcogenide nanocomposites. Chalcogenizing agents include sulfurization agents, selenization agents and tellurization agents. Hydrogen chalcogenides such as $H_2S$, $H_2Se$, and $H_2Te$ may be used. In addition, other chalcogenizing agents may be used which include labile metal-chalcogenides, elemental chalcogens, thioamide (e.g., methylthioamide), thioacetamide (e.g., methoxythioacetamide), thiourea, bis-(trimethylsilylsulfide), carbon disulfide, and the like. Labile metal-chalcogenides include $Al_2S_3$, $Al_2Se_3$, $Al_2Te_3$, $Na_2S$, $Na_2Se$, $Na_2Te$, $CaS$, $CaSe$, $CaTe$, $FeS$, $FeSe$, $FeTe$, $TiS_2$, $TiSe_2$, $TiTe_2$, $ZrS_2$, $ZrSe_2$, $ZrTe_2$, $B_2S_3$, $B_2Se_3$, and $B_2Te_3$. Elemental chalcogens include S, Se, and Te.

The chalcogenization treatment may be carried out either in solution form or in powder form of host-guest metal oxide sols. In one embodiment, the host-guest metal oxide sols in a wet state may be subject to chalcogenization treatment. The host-guest metal oxide sols may be dissolved in a liquid. The liquid may be water and/or an organic solvent. In one embodiment, the host-guest metal oxide sols are dissolved in an organic solvent. In another embodiment, the host-guest metal oxide sols are dissolved in a mixture of water and at least one organic solvent. In another embodiment, the host-guest metal oxide sols are dissolved in water, followed by addition of an organic solvent. In yet another embodiment, the host-guest metal oxide sols are dissolved in an organic solvent, followed by addition of water.

One or more of any suitable organic solvent may be employed to dissolve the host-guest metal oxide sols for the chalcogenization. Examples of organic solvents include alcohols (mono and polyols), esters, ketones, ethers, alkanes, aromatic compounds, heterocyclic compounds, and the like. Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, iso-amyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like.

The host-guest metal oxide sols may be dissolved for the chalcogenization in water and/or an organic solvent at a temperature suitable to facilitate dissolving. In one embodiment, the temperature while dissolving the host-guest metal oxide sols is maintained from about 20° C. to about 150° C. In another embodiment, the temperature while dissolving the host-guest metal oxide sols is maintained from about 30° C. to about 100° C.

The host-guest metal oxide sols solution may be treated with a chalcogenizing agent. In one embodiment, chalcogenizing agent gas may be bubbled through the solutions. In another embodiment, the host-guest metal oxide sols solution may be combined with chalcogenizing agent solution.

The chalcogenization treatment may be carried out in powder form of host-guest metal oxide sol. The host-guest metal oxide sols powder may be exposed to a chalcogenizing agent. In one embodiment, the host-guest metal oxide sol powder may be exposed to a chalcogenizing agent gas.

The chalcogenization treatment may be carried out at a temperature suitable to facilitate chalcogenization. In one embodiment, the chalcogenization treatment is carried out at an ambient temperature. In another embodiment, the temperature during chalcogenization is maintained from about 10° C. to about 150° C. In another embodiment, the temperature during chalcogenization is maintained from about 15° C. to about 100° C.

The nanocomposites containing the host metal oxide sols and guest metal phosphate nanoparticles can be prepared by phosphatizing the host-guest metal oxide sols containing the host metal oxide sols and at least one of guest metal phosphate precursors, guest metal nanoparticles, and guest metal oxide nanoparticles. The guest metal phosphate precursors, guest metal nanoparticles, and guest metal oxide nanoparticles in the host-guest metal oxide sols may be phosphatized to provide the nanocomposites containing the host metal oxide sols and guest metal phosphate nanoparticles.

The host-guest metal oxide sols may be treated with a phosphatizing agent at ambient temperature or at elevated temperatures to provide the metal phosphate nanocomposites. Generally the phosphatizing agents are alkyl phosphates, polyphosphoric acid esters and phosphate ions that may or may not contain additional metal salts. Examples of phosphatizing agents include methylphosphate, ethylphosphate, polyphosphoric acid methylester and an acidic aqueous solution of phosphate ion.

The phosphatization treatment may be carried out either in solutionform form of host-guest metal oxide sols. In one embodiment, the host-guest metal oxide sols in a wet state may be subject to phosphatization treatment. The host-guest metal oxide sols may be dissolved in a liquid. The liquid may be water and/or an organic solvent. In one embodiment, the host-guest metal oxide sols are dissolved in an organic solvent. In another embodiment, the host-guest metal oxide sols are dissolved in a mixture of water and at least one organic solvent. In another embodiment, the host-guest metal oxide sols are dissolved in water, followed by addition of an organic solvent. In yet another embodiment, the host-guest metal oxide sols are dissolved in an organic solvent, followed by addition of water.

One or more of any suitable organic solvent may be employed to dissolve the host-guest metal oxide sols for the phosphatization. Examples of organic solvents include alcohols (mono and polyols), esters, ketones, ethers, alkanes, aromatic compounds, heterocyclic compounds, and the like.

Specific examples of organic solvents include dimethyl ether, diethyl ether, dipropyl ether, dibutyl ether, methyl t-butyl ether, methyl phenyl ether and other aliphatic or alkyl aromatic ethers, methoxy ethanol, ethoxy ethanol, butoxy ethanol, ethoxy-2-propanol, propoxy ethanol, butoxy propanol and other glycol ethers, methyl acetate, ethyl acetate, isoamyl acetate, alkyl carboxylic esters, butanol, iso-butanol, amyl alcohol, cyclohexanol, and other aliphatic alcohols, hexane, cyclohexane, tetrahydrofuran, acetone, methyl ethyl ketone, methyl isobutyl ketone, mesityl oxide, methyl amyl ketone, cyclohexanone and other aliphatic ketones, n-methylpyrrolidinone, benzene, naphthalene, toluene, xylenes, and the like.

The host-guest metal oxide sols may be dissolved for the phosphatization in water and/or an organic solvent at a temperature suitable to facilitate dissolving. In one embodiment, the temperature while dissolving the host-guest metal oxide sols is maintained from about 20° C. to about 150° C. In another embodiment, the temperature while dissolving the host-guest metal oxide sols is maintained from about 30° C. to about 100° C.

The host-guest metal oxide sol solution may be treated with a phosphatizing agent. In another embodiment, the host-guest metal oxide sol solution may be combined with phosphatization agent solution.

The phosphatization treatment may be carried out at a temperature suitable to facilitate phosphatization. In one embodiment, the phosphatization treatment is carried out at an ambient temperature. In another embodiment, the temperature during phosphatization is maintained from about 10° C. to about 150° C. In another embodiment, the temperature during phosphatization is maintained from about 15° C. to about 100° C.

The nanocomposite containing the host metal oxide sol and guest metal phosphate nanoparticles can be prepared by treating the metal oxide sol solution with metal phosphate sol. The metal phosphate sol in sol solution form or dry powder form can be combined with the metal oxide sol to form the host-guest metal oxide sol nanocomposite. Exemplary metal phosphate sol for use in the invention are illustrated in U.S. patent application Ser. No. 11/070,626, filed on Mar. 2, 2005, titled "METAL PHOSPHATE SOLS, METAL NANOPARTICLES, METAL-CHALCOGENIDE NANOPARTICLES, AND NANOCOMPOSITES MADE THEREFROM," which is hereby incorporated by reference.

The metal phosphate sol can be prepared by combining certain relative amounts of the metal oxide compound, a phosphate precursor, and the organosilane with a liquid such as water and/or an organic solvent.

Phosphate precursors include alkylphosphates, polyphosphoric acid, and polyphosphoric acid esters. Examples of alkylphosphates may include methylphosphate, ethylphosphate, propylphosphate, butylphosphate, pentylphosphate, hexylphosphate, dimethylphosphate, diethylphosphate, dipropylphosphate, dibutylphosphate dipentylphosphate, methylethylphosphate, ethylbutylphosphate, ethylpropylphosphate, trimethylphosphate, triethylphosphate, tripropylphosphate, tributylphosphate, tripentylphosphate, ethyl dimethylphosphate, and ethyl dibutylphosphate. Polyphosphoric acid esters include esters of di-, tri-, tetra-, pentaphosphoric acid with a monohydric alcohol and/or polyhydric alcohol. Examples of polyphosphoric acid esters include polyphosphoric acid methyl ester, polyphosphoric acid ethyl ester, polyphosphoric acid propyl ester, polyphosphoric acid butyl ester, polyphosphoric acid pentyl ester, polyphosphoric acid dimethyl ester, polyphosphoric acid diethyl ester, polyphosphoric acid dipropyl ester, polyphosphoric acid dibutyl ester, diphosphoric acid methyethyl ester, diphosphoric acid ethylbutyl ester, diphosphoric acid ethylpropyl ester, diphosphoric acid ethylhexyl ester, trialkyl ester of di-, tri-tetra-, pentaphosphoric acid, tetraalkyl ester of di-, tri-tetra-, penta-phosphoric acid, pentaalkyl ester of di-, tri-tetra-, penta-phosphoric acid, and hexaalkyl ester of di-, tri-tetra-, pentaphosphoric acid.

Alkylphosphates and polyphosphoric acid esters are commercially available. For example, ethylphosphate is available from Acros Organics, Alfa Aesar, and Fluka Chemical Corp. Phosphonic acids, phosphinic acids, and their esters are also commercially available. Phosphonic acid is available from Acros Organics, Alfa Aesar, and Fluka Chemical Corp. Polyphosphoric acid esters, phosphonic acid esters, and phosphinic acid esters can be synthesized by the dehydration of mixtures of alcohol with polyphosphoric acid, phosphonic acid, and phosphinic acid, respectively. For example, phosphonic acid and ethanol can be used to synthesize phosphonic acid ethyl ester.

The metal phosphate sols are prepared by combining the metal oxide, the phosphate precursor, and the organosilane in any suitable order with a liquid such as water and/or an organic solvent. In this connection, the metal oxide, the phosphate precursor, and the organosilane may be simultaneously combined; the metal oxide and the phosphate precursor may be initially combined, followed by addition of the organosilane; the metal oxide and the organosilane may be initially combined, followed by addition of the phosphate precursor; or the organosilane and the phosphate precursor may be initially combined, followed by addition of the metal oxide. Optionally, the boron oxide compound may be added to the solution at any time. The presence of boron oxide compound in the reaction solution may allow one to maintain a clear solution throughout the reaction.

The metal oxide, phosphate precursor, organosilane, and optional boron oxide compound are combined in a liquid to form the metal phosphate sol. The liquid is at least one of water and an organic solvent. In one embodiment, the metal oxide, phosphate precursor, organosilane, and optional boron oxide compound are combined in a mixture of water and at least one organic solvent. In another embodiment, the metal oxide, phosphate precursor, organosilane, and optional boron oxide compound are combined in an organic solvent, followed by addition of water. Regardless of the liquid protocol, a certain minimum amount of water is desirably provided to facilitate formation of stable sols. To facilitate the formation of metal phosphate sols, in one embodiment, from about 10 mole % to about 80 mole % of the metal oxide, 5 mole % to about 70 mole % of the phosphate precursor, and from about 5 mole % to about 80 mole % of the organosilane are combined to form the metal phosphate sols.

Certain relative amounts of the metal oxide sol and the metal phosphate sol are combined in order to facilitate the formation of the nanocomposite containing the host metal oxide sol and guest metal phosphate nanoparticles. In one embodiment, from about 20% to about 99.999% by weight of the metal oxide sols and from about 0.001% to about 80% by weight of the metal phosphate sol are combined to form the nanocomposite containing the host metal oxide sol and guest metal phosphate nanoparticles. In another embodiment, from about 50% to about 99.995% by weight of the metal oxide sols and from about 0.005% to about 50% by weight of metal phosphate sol are combined to form the nanocomposite containing the host metal oxide sol and guest metal phosphate nanoparticles. In yet another embodiment, from about 80% to about 99.99% by weight of the metal oxide sols and from about 0.01% to about 20% by weight of metal phosphate sol are combined to form the nanocomposite containing the host metal oxide sol and guest metal phosphate nanoparticles.

The metal oxide sol containing silica sol can be prepared by treating a solution of metal oxide sol (or its precursor) and silica sol (or its precursor). Exemplary silica sol for use in the invention are illustrated in U.S. patent application Ser. No. 11/202,293, filed on Aug. 11, 2005, entitled "TRACTABLE SILICA SOLS AND NANOCOMPOSITES THEREFROM", which is hereby incorporated by reference.

The silica sols can be prepared by mixing certain amounts of at least one hydrolysable silane; at least one organofunctional silane; at least one of a boron oxide compound; and a liquid. The silica sols can be prepared by mixing certain amounts of at least one hydrolysable silane; at least one organofunctional silane; at least two catalysts; and a liquid. Dried silica sols can be prepared by removing the liquid from the silica sol.

A hydrolysable silane includes compounds represented by Formula I:

$$Si(R^6)_4 \qquad (V)$$

wherein each $R^6$ is individually at least one hydrolysable group selected from the group consisting of a ketoxime group, an alkoxy group, an alkenoxy group, an acyloxy group, an acetoxy group, a halo group, and an amino group. The hydrolysable group may contain from 1 to about 8 carbon atoms. Examples of hydrolysable silane include ketoximesilanes, alkoxysilanes, alkenoxysilanes, acyloxysilanes, acetoxysilanes, halosilanes, and aminosilanes. For example, when the hydrolysable group is an alkoxy group, examples of the alkoxy group include methoxy, ethoxy, propoxy and butoxy groups, and examples of alkoxysilane include tetramethoxysilane, tetraethoxysilane, tetrapropoxysilane, tetra-n-butoxysilane, dimethoxydiethoxysilane, dimethoxydiproxysilane, partially precondensed tetraethoxysilane (such as Silbond H-5 from Silbond Corp) and the like. Other examples of hydrolysable silane include tetrachlorosilane, tetraacetoxysilane, and tetrakis(dimethylamino)silane.

Organofunctional silanes include the same compounds as mentioned above. Boron oxide compounds include the same compounds as mentioned above. Catalysts include the same compounds as mentioned above.

In one embodiment, the silica sols are prepared by combining the hydrolysable silane, the organofunctional silane, and the boron oxide compound in any suitable order with a liquid such as water and/or an organic solvent. In this connection, the hydrolysable silane, the organofunctional silane, and the boron oxide compound may be simultaneously combined; the hydrolysable silane and the organofunctional silane may be initially combined, followed by addition of the boron oxide compound; the hydrolysable silane and the boron oxide compound may be initially combined, followed by addition of the organofunctional silane; or the boron oxide compound and the organofunctional silane may be initially combined, followed by addition of the hydrolysable silane. The presence of boron oxide compound in the reaction solution may allow one to maintain a clear solution throughout the reaction. One or more of any suitable acid catalyst, base catalyst, or organic and inorganic salt/complex catalyst in the amount of about less than about 5% by weight may be optionally employed to facilitate the formation of the silica sols.

In one embodiment, the silica sols are prepared by mixing the hydrolysable silane, the organofunctional silane, an acid catalyst and/or salt/complex catalyst, in any suitable order with a liquid such as water and/or an organic solvent to provide intermediate sols; and mixing a liquid such as an organic solvent and the base catalyst with the intermediate sol to provide the silica sol. In another embodiment, the intermediate sol is provided by using a weak acid catalyst and the silica sol is provided by using a strong base catalyst. In yet another embodiment, the intermediate sol is provided by using an acid catalyst and the silica sol is provided by using a base catalyst at more than 1 of a molar ratio of base/acid. Optionally, the boron oxide compound may be added to the solution at any time. The presence of boron oxide compound in the reaction solution may allow one to maintain a clear solution throughout the reaction.

In one embodiment, the silica sols are prepared by mixing the hydrolysable silane, the organofunctional silane, an acid catalyst and/or salt/complex catalyst, in any suitable order with a liquid such as water and/or an organic solvent to provide intermediate sols; removing the liquid from the intermediate sols; and mixing a liquid such as an organic solvent and the base catalyst with the intermediate sol to provide the silica sol. When a volatile acid catalyst is employed, the volatile acid catalyst is removed at an elevated temperature. Optionally, the boron oxide compound may be added to the solution at any time. The presence of boron oxide compound in the reaction solution may allow one to maintain a clear solution throughout the reaction.

When a boron oxide compound is added to prepare the metal oxide sol, the boron oxide compound can be removed once the metal oxide sol is prepared. A metal oxide sol without boron oxide compound also can be used as a host for the nanoparticles. If desired, the boron oxide can be removed from a metal oxide sol anytime including before or after making a host-guest metal oxide sol and after making a metal oxide sol nanocomposite.

The nanocomposites containing the host metal oxide sols and at least one of guest metal nanoparticles, guest metal-chalcogenide nanoparticle, guest metal phosphate nanoparticle and guest metal oxide nanoparticle may be stored in a wet or dry state. For example, in the wet state, the metal oxide compound, organofunctional silane, boron oxide, at least one of guest metal nanoparticles, guest metal-chalcogenide nanoparticle, guest metal phosphate nanoparticle and guest metal oxide nanoparticle, and organic solvent and/or water are simply stored in a container. In another embodiment, in the wet state, the metal oxide compound, organofunctional silane, at least one of an acid catalyst and salt/complex catalyst, at least one of guest metal nanoparticles, guest metal-chalcogenide nanoparticle, guest metal phosphate nanoparticle and guest metal oxide nanoparticle, and organic solvent and/or water are simply stored in a container. In yet another embodiment, the nanocomposites are made by mixing at least one of metal nanoparticle, metal-chalcogenide nanoparticle, guest metal phosphate nanoparticle and metal oxide nanoparticle, the metal oxide compound, the organofunctional silane, the acid catalyst and/or salt/complex catalyst, and a liquid to provide an intermediate sol, removing the liquid from the intermediate sol, and mixing a liquid and the base catalyst with the intermediate sol to provide the nanocomposite; or mixing the metal oxide compound, the organofunctional silane, the acid catalyst and/or salt/complex catalyst, and a liquid to provide an intermediate sol, removing the liquid from the intermediate sol, and mixing at least one of metal nanoparticle, metal-chalcogenide nanoparticle, guest metal phosphate nanoparticle and metal oxide nanoparticle, a liquid, and the base catalyst with the intermediate sol to provide the nanocomposite, and the nanocomposites are simply stored in a container.

When storage in a wet state is employed, delivery and movement of the nanocomposites is facilitated by minimizing the amount of liquid. In one embodiment, the nanocomposites may be stored in a wet state for at least about 12 months. In another embodiment, the nanocomposites may be stored in a wet state for at least about 24 months. In yet another embodiment, the nanocomposites may be stored in a wet state for at least about 36 months. When stored in a wet state, flocculation is mitigated and/or eliminated. When stored in a wet or dry state, color changes are mitigated and/or eliminated.

When storing in a dry state, the nanocomposites in the wet state are subject to an evaporation technique, with optional heating, to remove the liquids present. A vacuum may be employed. The resultant dry nanocomposites are generally in a powder-like form. In one embodiment, the nanocomposites may be stored in a dry state for at least about 12 months. In another embodiment, the nanocomposites may be stored in a dry state for at least about 24 months. In yet another embodiment, the nanocomposites may be stored in a dry state for at least about 36 months.

In one embodiment, the dried nanocomposites contain less than about 0.5% by weight of water. In another embodiment, the dried nanocomposites contain less than about 0.1% by weight of water. In yet another embodiment, the dried nanocomposites contain less than about 0.05% by weight of water.

When storing in a dry state, the nanocomposites can be heated up to about 220° C. for about 6 hours without degradation. Also when storing in a dry state, the dried nanocomposites can be stored in at least a semi-airtight container, although this is not necessary. Due to the stability of the nanocomposites, an advantage is that they may be stored in the open air without degradation. This is because it is believed that nanocomposites resist water uptake and/or are stable to oxidation. It is another alternative to store the dried nanocomposites in an airtight container or in a vacuum pack/state.

A polymer composite contains at least a polymer material, and the metal oxide sols and/or nanocomposites containing the host metal oxide sols and at least one of the metal nanoparticles, metal-chalcogenide nanoparticles, metal phosphate nanoparticles and metal oxide nanoparticles. The polymer composite may further contain optional additives such as, for example, coupling agents (silane, titanium, or zirconium coupling agents), plasticizers, surfactants, catalysts, and fillers. Additives can enhance sol-polymer compatibility and/or nanocomposite-polymer compatibility. The metal oxide sols and/or the metal nanocomposites are incorporated into the polymer matrix on a nanoscale basis in a substantially uniform manner. That is, the metal oxide sols and/or the nanocomposites are uniformly dispersed throughout the polymer material. Generally speaking, polymer materials include glasses, ceramics, polymers, and the like. Generally speaking, polymers include thermosets, thermoplastics, synthetic rubbers, extrudable polymers, injection molding polymers, moldable polymers, and the like.

The nanocomposites containing at least one of the metal nanoparticles, metal-chalcogenide nanoparticles, metal phosphate nanoparticles and metal oxide nanoparticles have a small size permitting uniform incorporation into a polymer material. Since the nanocomposites can disperse within a medium such as a liquid or polymer material without aggregation, the small size is retained after incorporation.

The small size of the nanocomposites is controllable. In one embodiment, at least 50% by weight of the nanocomposites have a particle size from about 1 nm to about 250 nm, or a particle size of about 250 nm or less. In another embodiment, at least 50% by weight of the nanocomposites have a particle size from about 2.5 nm to about 100 nm, or a particle size of about 100 nm or less. In another embodiment, at least 50% by weight of the nanocomposites have a particle size from about 5 nm to about 50 nm, or a particle size of about 50 nm or less.

The controllable particle size is particularly advantageous because the presence of the nanocomposites in a medium such as polymer material may induce color shifts. For example, generally smaller sized CdS nanoparticles of the nanocomposites generate a blue color shift, while generally larger sized CdS nanoparticles of the nanocomposites generate a red color shift. The ability to generate color shifts makes the nanocomposites suitable for use in various optical applications.

The nanocomposites may be incorporated into a polymer material to form a polymer composite, or they may be used in applications where the nanoparticles can be used, such as in sensor devices, catalysts, photonics devices, high density magnetic recording components, recording media, other magnetic applications, color filters, dyes, optical filters, hair coloring products, solar energy conversion, flame retardant, corrosion protection coating, battery, photocatalysis, electronics, nonlinear optics, electroluminescent displays, photoluminescent sensors, nanoelectronic devices, biological probes, light-emitting quantum dots, quantum dot lasers, and the like.

The polymer is any suitable material capable of forming a pre-polymer material, a partially polymerized material or a polymer, that incorporates therein the metal oxide sols and/or the nanocomposites. The polymer may be a dielectric material. The polymer may be polymer monomers, a B-staged polymer, or a polymer. In one embodiment, the polymer is at least one of a polyacrylate such as polyacrylates (polymethylmethacrylate), unsaturated polyesters, saturated polyesters, polyolefins (polyethylenes, polypropylenes, polybutylenes, and the like), alkyd resins, epoxy polymers, polyamides, polyimides, polyetherimides, polyamideimides, polyesterimides, polyesteramideimides, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybemzoxazoles, polybenzthiazoles, polyfluorocarbones, polyphenylene ethers, polyarylates, cyanate ester polymers, polypeptides, polynucleotides, and copolymers of two or more thereof, and the like.

Suitable polymers include acrylic resins. Examples of acrylic monomers include monoacrylics, diacrylics, triacrylics, tetraacrylics, pentacrylics, etc. Examples of polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxyethylacrylate, poly-2-phenoxyethylmethacrylate, poly-2-ethylbutylmethacrylate, poly-9-anthracenylmethyl methacrylate, poly-4-chlorophenylacrylate, polycyclohexylacrylate, polydicyclopentenyloxyethyl acrylate, poly-2-(N,N-diethylamino)ethyl methacrylate, polydimethylaminoeopentyl acrylate, poly-caprolactone 2-(methacryloxy)ethylester, and polyfurfurylmethacrylate, poly(ethylene glycol)methacrylate, polyacrylic acid and poly (propylene glycol)methacrylate.

Examples of suitable diacrylates which can be used to form polyacrylates include 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol dimethacrylate, 1,6-hexanediol diacrylate, neopentyl glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cycloheanedimethanol dimethacrylate, and diacrylic urethane oligomers (reaction products of isocyanate terminate polyol and 2-hydroethylacrylate).

Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di-trimethylopropane tetraacrylate, and ethoxylated pentaerythritol tetraacrylate. Examples of pentaacrylates include dipentaerythritol pentaacrylate and pentaacrylate ester.

Polyacrylates include other aliphatically unsaturated organic compounds, such as polyacrylamides and unsaturated polyesters, which are condensation products of unsaturated dicarboxylic acids and diols, and vinyl compounds, or compounds having a terminal double bond. In one embodiment, these materials are co-cured with the acrylic component by free radical technique. Examples of vinyl compounds include N-vinylpyrrolidone, styrene, vinyl naphthalene and vinylphtalimide. Polyacrylamides (including poly(meth) acrylamide derivatives) are commercially available. Some of the particular (meth)acrylamide derivatives include N-alkyl- or N-alkylene-substituted or unsubstituted (meth)acrylamides. Specific examples thereof are acrylamide, methacrylamide, N-methacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-isopropylacrylamide, N-n-propylacrylamide, N-isopropylmethacrylamide, N-n-propylmethacrylamide, N-acryloyloylpyrrolidine, N-methacryloylpyrrolidine, N-acryloylpiperidine, N-methacryloylpiperidine, N-acryloylhexahydroazepine, N-acryloylmorpholine and N-mathacryloylmorpholine.

Other suitable polymers include unsaturated and saturated polyesters including alkyd resins. The polyesters may be condensation polymers derived by the condensation of polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are or are not subject to cross-linking.

The unsaturated polyesters are prepared by reacting the one or more unsaturated polybasic acids or anhydrides with the polyols (di- or tri-hydroxy compounds) in approximately equal proportions. Examples of such polyesters include polyesters prepared from: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). A wide variety of polyester resins that can be used are commercially available.

Suitable polymers include epoxy resins. Epoxy resins include resins comprised of monomers, oligomers, and polymers containing one or more oxirane rings. A wide variety of such resins are available commercially. Such resins have either a mixed aliphatic-aromatic or an exclusively non-benzeneoid (i.e., aliphatic or cycloaliphatic) molecular structure. Representative examples of acceptable substituent groups include halogens, ester groups, ether groups, sulfonate groups, siloxane groups, nitro groups, and phosphate groups.

Epoxy resins are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350-400 and an epoxide equivalent of about 175-210. Epoxy resins such as Araldite 6010, manufactured by Ciba-Geigy can also be utilized. These epoxy resins are of the glycidyl-type epoxide, and are preferably diglycidyl ethers of bis-phenol A which are derived from bisphenol and epichlorohydrin.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent. Another group of epoxy resins are available from Furane Plastics Inc., Los Angeles, Calif. under the general trade designations EPIBOND and EPOCAST. For example, EPIBOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." and "D.E.W." resins obtainable from Dow Chemical Company and "Epotuf" liquid epoxy resins obtainable from Reichhold Chemicals Inc. are examples of such resins preferred for employment in accordance with the invention. An example is an "Epotuf" liquid epoxy resin in the undiluted medium high viscosity #37-140 having an epoxide equivalent weight of 180-195, a viscosity (ASTM D445) of 11,000-14,000 cps at 25° C., and a Gardner Color Maximum of 3.

In some embodiments the epoxy resins may be "solubilized" by neutralization with a basic compound such as an organic amine. Examples of amines include amines and hydroxyamines including diethylamine, triethylamine, triethanolamine, dimethylethanolamine, etc. Epoxy resins also include polyamide modified epoxy resins, such as AF-42 from Minnesota Mining and Manufacturing Co.

Additional examples of the epoxy resins derived from amines include tetraglycidyldiaminodiphenylmethane, triglycidyl-p-aminophenol, triglycidyl-m-aminophenol and triglycidylaminocresol and their isomers, examples of the epoxy resins derived from phenols include bisphenol A epoxy resins, bisphenol F epoxy resins, bisphenol S epoxy resins, phenol-novolak epoxy resins, cresol-novolak epoxy resins and resorcinol epoxy resins, and examples of the epoxy resins whose precursors are compounds having a carbon-carbon double bond are alicyclic epoxy resins. Moreover, brominated epoxy resins prepared by brominating these epoxy resins can be used, but the subject invention is not restricted to the use of these compounds. Furthermore, mixtures of two or more of the epoxy resins can be used and monoepoxy compounds can also be incorporated.

Generally, epoxy resins for use in the invention are compositions containing glycidyl ether monomers. Representative examples of these are the glycidyl ethers of polyhydric phenols obtained by reacting a polyhydric phenol with an excess of chlorohydric, such as epichlorohydrin. Specific examples of epoxy resins include 2,2-bis[4-(2,3-epoxypropoxy)phenyl]propane(diglycidyl ether of bisphenol A) and commercially available materials under the trade designation "Epon 828F", "Epon 1004F" and "Epon 1001F" available from Shell Chemical Co., "DER-331", DER-332" and "DER-334" available from the Dow Chemical Co. Preferred is the diglycidyl ether of bisphenol A, "CMD 35201" available from Rhone Poulenc, Inc., Louisville, Ky. Other suitable epoxy resins include glycidyl ethers of phenol formaldehyde novolak resins (e.g., "DEN-431" and "DEN-438" available from the Dow Chemical Co.), and resorcinol digylcidyl ether. Additional examples of epoxides are described in U.S. Pat. No. 3,018,262, incorporated herein by reference.

Epoxy resins further include UV curable epoxies and cycloaliphatic epoxy resins. UV curable epoxies and cycloaliphatic epoxy resins are available under the trade designation Cyracure® specifically including products 6100, 6105, 6110, and 6351 from Union Carbide/Dow Chemical.

Suitable polymers include polyamides. In particular, the polymers may be aliphatic or aromatic polyamides. Polyamides are commercially available. Examples of polyamides include those under the trade designations Zytel available from DuPont, Capron from AlliedSignal, Texapol from Hanna, Ashlene from Ashley, Ultramid from BASF, Durethan from Bayer, Grilamid from EMS, Vestamid from Huls America, Vydyne from Monsanto, Wellamid from Wellman and others.

Specific examples of polyamides include nylon 6 (polycaprolactam), nylon 6/6 (polyhexamethyleneadipamide), nylon 6/10 (condensation product of hexamethylenediamine and sebacic acid), nylon 6/12, nylon 6/T (polyhexamethylene terephthalamide), nylon 7 (polyenanthamide), nylon 8 (polycapryllactam), nylon 9 (polypelargonamide), nylon 10, nylon 11, nylon 12, nylon 55, nylon XD6 (poly metha-xylylene adipamide), nylon 6/I, poly-alanine, NOMAX® 410 available from DuPont, polyamides under the trade designations PA 7030 and 5050 available from Dow, and Ultramid K1297/2 available from BASF.

Suitable polymers include polyimides. Polyimides can be prepared by reacting a diisocyanate with a dianhydride, or a dianhydride with an aromatic diamine (such as 3,3',4,4'-benzophenonetetracarboxylic dianhydride-co-4,4'-oxydianiline and methylenedianiline). Examples of polyimides include KAPTON and VESPEL available from DuPont.

Suitable polymers include polyetherimides. Polyetherimides are polymers containing ether and imide linkages. For example, polyetherimides can be prepared by reacting at least one diamine, such as m-phenylenediamine or p-phenylenediamine, with at least one ether dianhydride, such as 2,2-bis [(3,4-dicarboxyphenoxy)phenyl]propane dianhydride. Polyetherimides are commercially available. Examples of polyetherimides include those under the trade designation ULTEM-1000, ULTEM-4000 and ULTEM-6000 from General Electric, RTP 2101, 2103 and 2105 from RTP and Thermofil W-10FG0100, W-20FG0100 and W-30FG0100 from Thermofil. Polyetherimides also include silicone polyetherimides.

Suitable polymers also include polyamideimides. Polyamideimides may be prepared by condensing an imide and an amide. Polyamideimides are commercially available. Examples of polyamideimides include those under the trade designation TORLON™ available from Amoco and Lack E 3560/32 and 3561/27 available from Herberts Gmbh.

Suitable polymers include polyesterimides. Polyesterimdes are commercially available. Examples of polyesteramides include TERBEC® 533 L-33 available from BASF, IMI-DEX-E available from General Electric and those made according to U.S. Pat. Nos. 3,426,098 and 3,697,471 which are herein incorporated by reference.

Suitable polymers include polyesteramideimides. Polyesteramideimides are commercially available. Examples of polyesteramideimides include copolymers of any combination of a polyester, a polyamide and polyimide.

In one embodiment, polymer composites contain from about 1% by weight to about 99.99% by weight of the polymer and from about 0.01% by weight to about 99% by weight of the metal oxide sols and/or the nanocomposites containing at least one of the metal nanoparticles, metal-chalcogenide nanoparticles, metal phosphate nanoaprticles and metal oxide nanoparticles. In another embodiment, the polymer composite contains a major amount of the polymer and a minor amount of the metal oxide sols and/or the nanocomposites, and optionally a minor amount of additives such as coupling agents. A major amount means at least 50% by weight or more, while a minor amount means less than 50% by weight. In another embodiment, polymer composites contain from about 20% by weight to about 99.9% by weight of the polymer and from about 0.1% by weight to about 80% by weight of the metal oxide sols and/or the nanocomposites containing at least one of the metal nanoparticles, metal-chalcogenide nanoparticles, metal phosphate nanoparticles, and metal oxide nanoparticles. In yet another embodiment, polymer composites contain from about 70% by weight to about 99% by weight of the polymer and from about 1% by weight to about 30% by weight of the metal oxide sols and/or the nanocomposites containing the metal nanoparticles, metal-chalcogenide nanoparticles, metal phosphate nanoparticles, and metal oxide nanoparticles.

The polymer composite is made by combining suitable amounts of the polymer and the metal oxide sols and/or the nanocomposites containing at least one of the metal nanoparticles, metal-chalcogenide nanoparticles, metal phosphate nanoparticles, and metal oxide nanoparticles. If the metal oxide sols and/or the nanocomposite are stored in a dry state, it can be combined with an organic solvent and/or water before combined with the polymer. The polymer is preferably in a liquid or semi-liquid state. The polymer and the metal oxide sols and/or the metal nanocomposite are mixed to facilitate uniform distribution of the metal oxide sols and/or the metal nanocomposite within the polymer. In one specific embodiment, the metal oxide sols powder and/or the nanocomposite powder (stored in a dry state) is combined with a polymer or prepolymer powder, and the mixture is then melted and molded or extruded.

After combining and mixing suitable amounts of the polymer and the metal oxide sols and/or the nanocomposites containing at least one of the metal nanoparticles, metal-chalcogenide nanoparticles, metal phosphate nanoparticles, and metal oxide nanoparticles, the mixture is then cured, molded, extruded, formed, or subjected to suitable polymer processing to form a polymer composite having the metal oxide sols and/or the nanocomposites substantially uniformly dispersed therein. In the case of a translucent polymer, for example a polyacrylate, the resultant polymer composite is also translucent, indicating that the metal oxide sols and/or the nanocomposite are dispersed on a nanoscale. Polymer composites are generally smooth, further indicating that the metal oxide sols and/or the nanocomposites are dispersed on a nanoscale.

The subject invention further provides methods of improving certain properties in polymer compositions, such as one or more of methods of improving strength, methods of improving corona resistance, methods of improving plasma resistance, methods of improving resistance to organic solvents, methods of improving high temperature stability, methods of improving flame retardancy, methods of improving oxidative stability, methods of modifying refractive index, methods of improving fracture properties, methods of improving abrasion resistance, methods of improving liquid permeability, methods of improving gas permeability including methods of improving gas permeability to specific gases, methods of improving (low) hysteresis loss (low rolling resistance), methods of improving corrosion protection, and methods of improving field responsive capability. The methods of improving certain properties in polymer compositions are accomplished by incorporating the metal oxide sols and/or the nanocomposites into polymer materials.

The following examples illustrate the subject invention. Unless otherwise indicated in the following examples and elsewhere in the specification and claims, all parts and percentages are by weight, all temperatures are in degrees Centigrade, RT is room temperature, and pressure is at or near atmospheric pressure.

EXAMPLES 1-3

Examples 1-3 involve the preparation of metal oxide sols using a boron oxide compound. The following three sols are prepared as described below: (1) preparation of a mixture of metal alkoxide and methoxyethanol in a vial; (2) addition of phenyltrimethoxysilane followed by stirring at RT/1 hr; (3) addition of boric acid followed by stirring at RT/1 hr; (4) addition of water followed by stirring at RT/overnight; (5) removal of volatile compounds followed by vacuum dry overnight. Table 1 lists concentrations of components. The yields of the resulting sol powders are 1.45 gm, 2.10 gm, and 2.03 gm, respectively. They are soluble in methoxyethanol to give colorless clear solutions.

TABLE 1

| Ex No | Metal alkoxide g (mmol) | Phenyl-trimethoxysilane g (mmol) | Boric acid g (mmol) | Water g (mmol) | Methoxy-ethanol ml |
|---|---|---|---|---|---|
| 1 | $(i-PrO)_3Al$, 0.93 (4.6) | 0.99 (5) | 0.31 (5) | 0.15 (8) | 4 |
| 2 | $(i-PrO)_4Ti$, 1.54 (5.4) | 1.43 (7.2) | 0.45 (7.2) | 0.2 (11) | 5 |
| 3 | 80% $(n-BuO)_4Zr$, 2.1 (4.4) | 1.16 (5.9) | 0.36 (5.8) | 0.17 (9.4) | 4 |

The above sol powders stored for 36 months at ambient temperature are placed in glass vials (30 mg/each) and heat-treated at 200° C./1 hr in an air circulated oven. The weights of the resulting powders are 21.8 mg, 23 mg and 22.8 mg, respectively. They are still tractable so that addition of methoxyethanol (0.5 g) gives colorless clear solutions.

EXAMPLE 4

Example 4 involves the preparation of metal oxide sols using a boron oxide compound and base catalyst. The sol powder (30 mg) prepared in Example 1 and stored for 36 months is combined with methoxyethanol (0.5 g) and tetraethylammonium hydroxide (0.5 mg) and stirred at 120° C./2 hrs. Removal of the volatiles followed by heat-treatment at 200° C./4 hrs gives yellowish residues (22.2 mg) that are readily soluble in methoxyethanol at RT to give a slightly yellowish clear solution.

EXAMPLES 5-7

Examples 5-7 describe the preparation of metal oxide sols by use of octyltriethoxysilane. The following three sols are prepared as described below: (1) preparation of a mixture of metal alkoxide and methoxyethanol in a vial; (2) addition of octyltriethoxysilane followed by stirring at RT/1 hr; (3) addition of boric acid followed by stirring at RT/1 hr; (4) addition of water followed by stirring at RT/overnight and 80° C./3 hrs; (5) removal of volatile compounds followed by vacuum dry overnight. The yields of the resulting sol powders are 1.02 gm, 0.98 gm, and 1.08 gm, respectively. Table 2 lists concentrations of components.

TABLE 2

| Ex No | Metal alkoxide g (mmol) | Octyl-trimethoxysilane g (mmol) | Boric acid g (mmol) | Water g (mmol) | Methoxy-ethanol ml |
|---|---|---|---|---|---|
| 5 | (i-PrO)$_3$Al, 0.8 (3.3) | 0.92 (3.3) | 0.2 (3.2) | 0.09 (5) | 5 |
| 6 | (i-PrO)$_4$Ti, 0.55 (1.9) | 0.84 (3) | 0.19 (3) | 0.08 (4.4) | 5 |
| 7 | 80 %[n-Bu)]$_4$Zr, 1.05 (2.2) | 0.81 (2.9) | 0.18 (2.9) | 0.08 (4.4) | 5 |

The above sol powders stored for 24 months at ambient temperature are placed in glass vials (30 mg/each) and heat-treated at 200° C./1 hrs in an air-circulated oven. The weights of the resulting powders are 25.2 mg, 27.1 mg and 26.7 mg, respectively. They are still tractable so that addition of xylene-methoxyethanol (9/1) gives colorless clear solutions.

EXAMPLE 8

Example 8 describes the preparation of aluminum oxide sol. A solution of aluminum sec-butoxide (0.145 g, 0.59 gm) in methoxyethanol (0.5 g) is stirred at 120° C./3 hrs in the presence of boric acid (0.016 g, 0.26 mmol) to give a milky solution. Addition of octyltriethoxysilane (0.044 g, 0.16 mmol) and DI water (0.03 g, 1.7 mmol) followed by stirring at RT/overnight and 120° C./4 hrs gives a slightly hazy solution. Removal of the volatiles followed by heat-treatment at 120° C./1 hr gives colorless residues that are then treated with methanol for 30 min. The precipitates collected are again treated with methanol for 30 min. The precipitates collected are then heat-treated at 120° C./1 hr to give colorless powders (0.063 g) that are soluble in xylene to give a clear solution. Fourier transform infrared (FTIR) analysis of the powder clearly exhibits the disappearance of a strong band at 1380 cm$^{-1}$ assigned to B—O stretching, indicating the removal of boron components (probably as volatile trimethyl borate) by methanol treatment.

EXAMPLE 9

Example 9 describes the preparation of titanium oxide/silicon oxide mixed sol. A solution of tetraethoxysilane (0.034 g, 0.16 mmol), phenyltrimethoxysilane (0.036 g, 0.18 mmol) and titanium propoxide (0.023 g, 0.08 mmol) in methoxyethanol (0.5 g) is prepared. Addition of boric acid ((0.008 g, 0.13 mmol) and DI water (0.03 g, 1.7 mmol) followed by stirring at RT/overnight and 120° C./3 hrs gives a clear solution. Removal of the volatiles followed by heat treatment at 180° C./1 hr gives colorless residues (0.047 g). The dried sol is readily soluble in methoxyethanol to give a clear solution.

EXAMPLE 10

Example 10 describes the preparation of magnetic iron oxide sol. A solution of Iron(III)ethoxide (0.065 g, 0.34 mmol) and methoxyethanol (0.5 g) is prepared. The solution is first treated with Iron(II)acetate (0.029 g, 0.17 mmol) at RT/1 hr and 120° C./5 hrs and then with boric acid (0.011 g, 0.18 mmol) at 120° C./2 hrs. After addition of phenyltrimethoxysilane (0.043 g, 0.22 mmol) and DI water (0.020 g, 1.1 mmol), the solution is stirred at RT/overnight and 120° C./2 hrs to give a brown solution. Removal of the volatiles under vacuum followed by heat-treatment at 155° C. gives brown powders (0.091 g) which respond to an applied magnetic field. Further heat-treatment of 21.3 mg of the sol powder at 180° C./1 hr reduces its weight to 18.7 mg. The dried sol is soluble in methoxyethanol to give a clear brown solution.

EXAMPLE 11

Example 11 involves the preparation of iron oxide sols using a boron oxide compound and base catalyst. The Iron oxide sol (20.3 mg) prepared and dried at 155° C. in Example 10 is combined with methoxyethanol (0.5 g) and tetraethylammonium hydroxide (0.5 mg) and stirred at 120° C./2 hrs. Removal of the volatiles under vacuum followed by heat-treatment at 200° C./4 hrs in an oven gives brown residues (16.8 mg). The sol is readily soluble in methoxyethanol at RT to give a clear brown solution.

EXAMPLE 12

Example 12 describes the preparation of zinc oxide sol. Zinc acetate dihydrate (0.113 g, 0.5 mmol) is dissolved in methanol (1.0 g) and admixed with boric acid (0.02 g, 0.32 mmol). The solution is combined with octyltriethoxysilane (0.12 g, 0.43 mmol), 5% HCl (5 mg) and DI water (0.032 g, 1.8 mmol) and stirred at RT/overnight. Removal of the volatiles under vacuum followed by heat treatment at 110° C./1 hr gives colorless residues (0.15 g). Further heat-treatment of the sol (30 mg) at 200° C./1 hr provides slightly yellowish powders (26 mg). The sol is soluble in xylene to give a clear solution.

EXAMPLE 13

Example 13 involves the preparation of zinc oxide sols using a boron oxide compound and base catalyst. Zinc acetate dihydrate (0.113 g, 0.5 mmol) is dissolved in methanol (1.0 g) and admixed with boric acid (0.02 g, 0.32 mmol). The solution is admixed with phenyltrimethoxysilane (0.067 g, 0.34 mmol) and DI water (0.032 g, 1.8 mmol) at RT/overnight and 65° C./10 hrs. Removal of the volatiles under vacuum followed by heat-treatment at 110° C./1 hr gives colorless powders (0.141 g). The sol heat-treated at 110° C. (30 mg) is combined with methoxyethanol (0.5 g) and tetraethylammonium hydroxide (0.6 mg) and heated at 120° C./2 hrs to give a clear solution which becomes milky when cooled to RT. Removal of the volatiles followed by heat-treatment at 200° C./2 hr provides colorless residues (28 mg) which are readily soluble in methylisobutylketone to give a clear colorless solution.

EXAMPLE 14

Example 14 describes the preparation of nickel oxide sol. A clear light green solution of nickel acetate tetrahydrate (0.079 gm, 0.32 mmol) and methoxyethanol (1.0 gm) is treated with boric acid (0.017 gm, 0.27 mmol) at Rt/overnight and then with octyltriethoxysilane (0.094 gm, 0.34 mmol) and 2% HCl (0.020 gm) at RT/overnight and 100° C./4 hrs. Removal of the volatiles under vacuum followed by heat-treatment at 150° C./1 hr gives light green powders (0.097 gm). Additional heat-treatment of 10 mg of the sol at 200° C./1 hr reduced its weight to 8.4 mg. The sol is fully soluble in methoxyethanol/xylene (½) to give a clear light green solution.

EXAMPLE 15

Example 15 describes the preparation of cobalt oxide sol. A clear purple solution of cobalt acetate tetrahydrate (0.075 g, 0.3 mmol) and methoxyethanol (1.5 g) is treated with boric acid (0.021 g, 0.34 mmol) at RT/overnight and then with octyltriethoxysilane (0.105 g, 0.38 mmol) and 2% HCl (0.02 g) at RT/overnight and 100° C./4 hrs. Removal of the volatiles under vacuum followed by heat-treatment at 150° C./1 hr gives purple powders (0.11 g). Additional heat-treatment of 10.6 mg of the sol at 200° C./1 hr reduces its weight to 9.4 mg. The sol is fully soluble in methoxyethanol/xylene (½) to give a clear purple solution.

EXAMPLE 16

Example 16 describes the preparation of metal oxide sol containing copper oxide. A mixture of copper acetate (0.019 g, 0.1 mmol) and methoxyethanol (1.0 g) is treated with tetraethoxysilane (0.166 g, 0.8 mmol) at RT/30 min. and 80° C./3 hr to give a clear deep green solution. After addition of 2% HCl (0.020 g), the solution is further stirred at RT/overnight to give a hazy light blue solution. The solution is further treated with octyltriethoxysilane (0.208 g, 0.75 mmol) and DI water (0.07 g, 3.9 mmol) at RT/1 hr and with boric acid (0.046 g, 0.74 mmol) at RT/overnight and 100° C./4 hrs. Removal of the volatiles under vacuum followed by heat treatment at 150° C./1 hr gives blue-green residues (0.244 g). Additional heat treatment of 10.3 mg of the sol at 200° C./1 hr reduces its weight to 8.3 mg. The sol is fully soluble in methoxyethanol/xylene (½) to give a clear light blue-green solution.

EXAMPLE 17

Example 17 describes the preparation of CdS nanoparticles hosted by metal oxide sol. Cadmium acetate (0.022 g, 0.096 mmol) is first dissolved in a solution of aluminum sec-butoxide (0.232 g, 0.94 mmol) in methoxyethanol (0.5 g). Subsequently, a solution of boric acid (0.058 g, 0.94 mmol) in methoxyethanol (0.4 g) is added. The resulting solution is then stirred overnight to obtain a milky solution. Addition of octyltriethoxysilane (0.261 g, 0.94 mmol) and water (0.028 g, 1.6 mmol) followed by stirring at RT/overnight and at 120° C./6 hrs gives a clear colorless solution. The volatiles are removed and the resulting residues are treated with methanol (0.5 g) by refluxing for ½ hr. The precipitates collected after centrifuge separation are again treated with methanol in the same manner. The precipitates are collected and then dried at 110° C./1 hr in an oven to give a colorless powder (0.27 g). FTIR analysis of the powder clearly exhibits the disappearance of a strong band at 1380 $cm^{-1}$ assigned to B—O stretching, indicating the removal of boron components (probably as volatile trimethyl borate) by methanol treatment. The sol powder (44 mg) thus obtained is first dissolved in xylene (0.5 g), stirred at 80° C./1 hr after addition of 3-mercaptopropyl-trimethoxysilane (1.3 mg), and then mixed with methylthioamide (1 mg) overnight at RT. The resulting clear yellow solution and its cast film on a glass plate exhibit a bright orange emission when exposed to UV in the dark. The CdS nanoparticles hosted by metal oxide sol are stored as a dried powder form over 24 months and then re-dissolved in an organic solvent to form a clear solution with a bright orange emission under UV.

EXAMPLE 18

Example 18 describes the preparation of CdS nanoparticles hosted by metal oxide sol. Cadmium acetate (0.03 g, 0.13 mmol) is added to a solution of aluminum sec-butoxide (0.219 g, 0.89 mmol) in methoxyethanol (0.5 g). The solution is then stirred overnight. A solution of boric acid (0.008 g, 0.13 mmol) in methoxyethanol (0.052 g) is added and the solution is further stirred at 120° C./2 hrs. A drop of water/methoxyethanol (1:1, ~0.016 mg) is added after cooling to RT and the resulting solution is stirred at RT/30 min. and 120° C./1 hr. The process is repeated six times to obtain a milky solution. Addition of octyltriethoxysilane (0.247 g, 0.89 mmol) followed by stirring at RT/overnight and at 120° C./5 hr gives a clear solution. The volatiles are removed and the resulting residues are treated with methanol (0.5 g) by refluxing for ½ hr. The precipitates collected after centrifuge separation are again treated with methanol in the same manner. The precipitates are collected and then dried at 110° C. for 1 hr in an oven to give a colorless powder (0.27 g). The dried sol (17 mg) is dissolved in xylene (0.3 g), stirred at 80° C./1 hr after addition of 3-mercaptopropyltrimethoxysilane (0.84 mg), and then mixed with methylthioamide (0.48 mg) at RT/overnight. The resulting clear yellow solution as well as its cast film exhibits a bright yellow emission when exposed to UV in the dark. The CdS/sol system is stored as a dried powder form beover 24 months and then re-dissolved in an organic solvent to form a clear solution with a bright yellow emission under UV.

EXAMPLE 19

Example 19 describes the preparation of CdS nanoparticles hosted by zirconium oxide sol. The dry sol prepared in Example 7 (0.102 g) and stored for 24 months is combined with methoxyethanol (1.0 g) and treated with cadmium acetate dihydrate (0.011 g) at 120° C./3 hrs. After removing the volatiles, the residues are dissolved in xylene (1.7 g) to obtain a clear solution. Two CdS nanoparticles samples are prepared as shown below:

(A) The above sol solution (0.34 g) is first treated with mercaptopropyltrimethoxysialne (0.75 mg) at 80° C./2 hrs and with methylhioamide (0.31 mg) at RT/overnight. The resulting slightly yellowish clear solution exhibits a bright yellow emission when exposed to UV in the dark.

(B) The above sol solution (0.34 g) is first treated with mercaptopropyltrimethoxysialne (1.33 mg) at 80° C./2 hrs and with methylhioamide (0.63 mg) at RT/overnight. The resulting clear solution exhibits a bright blue-green emission when exposed to UV in the dark.

These CdS/sol systems can be stored as a dried powder form and can be re-dissolved in a solvent to form clear solutions.

EXAMPLE 20

Example 20 describes the preparation Au nanoparticles hosted by aluminum oxide sol. A solution of aluminum sec-butoxide (0.389 g, 1.6 mmol) and methoxyethanol (1.4 g) in a brown glass vial is treated with mercaptopropyltrimethoxysilane (3.0 mg, 0.017 mmol) for 30 min. and then with Au(OH)$_3$ (2.8 mg, 0.011 mmol) for 2 hrs to give a brown solution. Addition of boric acid (0.112 g, 1.8 mmol) in methoxyethanol (0.76 g) followed by stirring at RT/24 hrs gives an opaque gel-like solution which is stored at RT and is evaluated to determine its stability by carrying out the following experiments:

(A) The above mixture (0.55 g) stored for one week is combined with octyltriethoxysilane (0.057 gm, 0.21 mmol) and DI water (0.015 g, 0.8 mmol) and then stirred at RT/24 hrs. Removal of the volatiles under vacuum followed by heat-treatment at 110° C. gives wine-red residues (0.08 g) that are washed with methanol twice, dried under vacuum and combined with xylene (0.5 g) and diphenylsilane diol (0.01 g). Stirring at RT/overnight followed by filtration gives a clear wine-red solution. It is cast on a glass plate at 160° C. to give a clear wine red film.

(B) The above mixture (0.44 g) stored for 15 months at RT in a vial is combined with octyltriethoxysilane (0.062 g, 0.31 mmol) and methoxyethanol (0.3 g) and xylene (0.6 g). It is stirred at RT/overnight to gradually decrease the viscosity of the solution. After addition of aluminum acetylacetate di sec-butoxide (2 mg), the mixture is further stirred at RT/4 days to give a wine red solution. It is then treated with diphenylsilane diol (0.04 g) at RT/overnight and 120° C./3 hrs. Filtration followed by casting on a glass plate at 160° C. gives a clear wine-red film. These films are still tractable so that they can be re-dissolved in xylene to give clear wire-red solutions.

EXAMPLE 21

Example 21 describes the preparation of Au nanoparticles hosted by titanium oxide sol. The sol powder (30 mg) prepared in Example 2 is heat-treated at 200° C./1 hr, dissolved in methoxyethanol (0.5 gm) and treated with mercaptopropyltrimethoxysilane (1.0 mg) at 120° C./2 hr. The resulting clear solution is wrapped with an aluminum foil and stirred at RT/overnight after addition of gold trihydroxide (1.1 mg). The brown solution is further stirred while being exposed to UV to gradually form a wine-red solution. Removal of the volatiles under vacuum followed by heat-treatment at 100° C./1 hr gives wine-red residues that are soluble in methoxyehanol.

EXAMPLE 22

Example 22 describes the preparation of Ag nanoparticles hosted by titanium oxide sol and polymer composites therefrom. A solution of titanium propoxide (0.212 g, 0.75 mmol) in methoxyethanol (1.5 g) is combined with silver acetate (0.045 g, 0.27 mmol) and stirred at RT/overnight. The resulting clear colorless solution is treated with phenyltrimethoxysilane (0.233 g, 1.17 mmol) at RT/1 hr, boric acid (0.062 g, 1 mmol) at RT/overnight, and DI water (0.03 g, 1.7 mmol) at RT/overnight. Removal of the volatiles under vacuum followed by heat-treatment to 100° C./2 hrs gives yellowish residues (0.28 g). The sol is soluble in methoxyethanol to give a clear yellow solution even after stored for more than 12 months. The Compatibility of the above sol with epoxy and acrylic resins is determined by prepareing organic/inorganic nanohybrids as described below:

(i) Epoxy system: The sol powder (0.016 g) is dissolved into a resin comprised of bisphenol A diglycidyl ether (0.07 g), bisphenol A propoxylate/ethoxylate (0.02 g), Z6040 silane (0.001 g) and methoxyethanol (0.05 gm). The resulting solution is poured onto a glass plate, dried under nitrogen flow and then cured at 80° C./30 min.+100° C./1 hr+150° C./2 hrs to give a clear deep-yellow film.

(ii) Acrylic system: The sol powder (0.01 g) is dissolved in a resin comprised of CN104D80 (0.06 g, from Sartomer Co.), hydroxyethyl methacrylate (0.015 g), Z6030 silane (0.001 g), benzil dimethyl ketal photoinitiator (0.002 g) and methoxyethanol (0.04 g). The resulting solution is poured onto a glass plate, heated to 60° C./30 min, exposed to UV (300 W UV lamp) for 2 minutes under nitrogen, and then heat-treatment at 140° C./30 min. to give a clear deep-yellow film.

EXAMPLE 23

Example 23 describes the preparation of Ag nanoparticles hosted by titanium oxide sol. The dried sol powder (0.042 g) prepared in Example 2 is dissolved in methoxyethanol (0.5 g), mixed with silver lactate monohydrate (0.009 g) and then stirred overnight in a dark place. After addition of $PhSiH_3$ (0.006 g), the solution is stirred at room temperature for 2 hrs followed by 70° C. for 1 hr to give a clear yellow solution. The UV/vis spectrum of the solution exhibits $\lambda$max at 410 nm, indicating the formation of Ag nanoparticles supported by the nanoscale metal oxide sol. The dried yellow powder (0.025 g) obtained by removing the volatiles is respectively mixed with the epoxy and acrylic resins and cured as described in Example 22 to give clear yellow films.

EXAMPLES 24-25

Examples 24-25 describe the preparation of metal oxide/polyimide (PI) and metal oxide/polyamideimide (PAI) nanocomposites. The metal oxide sol prepared in Example 1 (0.102 gm) is treated with methanol (0.5 g) by refluxing for ½ hr. The precipitates collected after centrifuge separation are again treated with methanol in the same manner. The precipitates are collected and then dried at 180° C./1 hr in an oven to give a colorless powder (0.065 gm). The following three solutions are prepared: (A) The above sol powder (0.014 gm) and aminophenyltrimethoxysilane (0.5 mg) in NMP (0.45 gm); (B) a polyamic acid solution (5 wt %) that is prepared by diluting poly (3,3',4,4'-benzophenonetetracarboxylic dianhydride-co-4,4'-oxydianiline/1,3-phenylenediamine), amic acid (19 wt. %, from Aldrich Chemical) with n-methylpyrrolidinone (NMP); (C) Polyamideimide precursor solution (18%) is prepared by diluting poly (trimellitic anhydride chloride-co-4,4'-methylenedianiline) powder (purchased from Aldrich Chemical) with NMP.

(i) Sol/PI: A homogeneous mixture of (A)/(B)=78 mg/245 mg in a vial is cast on a glass plate and cured at 60° C./20 min.+150° C./1 hr+250° C./30 min.+330° C./1 hr. The resulting brownish film is clear and uniform with no cracks.

(ii) Sol/PAI: A homogeneous mixture of (A)/(C)=105 mg/56 mg in a vial is cast on a glass plate and cured at 60° C./20 min.+150° C./1 hr+250° C./30 min.+280° C./1 hr. The resulting brownish film is clear and uniform with no cracks, indicating uniform dispersion of nanoscale metal oxide sols in these polymer matrices.

EXAMPLE 26

Example 26 describes the preparation of Au nanoparticles hosted by aluminum oxide sol. Aluminum sec-butoxide (0.475 g, 1.9 mmol) and methoxyethanol (0.74 g) are charged in a vial. After 20 minutes stirring using a magnetic stirrer, phenyltrimethoxysilane (0.382 g, 1.9 mmol) is added and stirred for 1 hr. Gold trihydroxide (0.011 g, 0.046 mmol) is added to the mixture in a dark place. After wrapping with aluminum foil, the resulting mixture is stirred overnight to form a dark brown solution. Boric acid (0.12 g, 1.9 mmol) is added and the mixture is stirred at RT/overnight. The solution is treated with DI water (0.053 g, 2.9 mmol) at RT/overnight. It is further stirred under sun or UV light to gradually generate a clear wine-red solution. The UV/vis spectrum of the sol solution exhibits the surface plasmon absorption of Au nanoparticles at 532 nm. Removal of the volatiles under vacuum overnight followed by heat-treatment at 100° C./2 hr gives deep wine-red powders.

EXAMPLE 27

Example 27 describes the preparation of polymer/metal oxide sol/Au nanocomposites. The Compatibility of the sol prepared in Example 26 with polyimide, epoxy and acrylic resins is determined as described below:

(i) Polyimide system: The sol powder (0.005 g) is first dissolved in N-methylpyrrolidinone (0.050 g) and then mixed with poly (3,3',4,4'-benzophenonetetracarboxylic dianhydride-co-4,4'-oxydianiline/1,3-phenylenediamine), amic acid (0.2 gm, 19 wt % solution from Aldrich Chemical). The resulting clear solution is poured onto a glass plate and cured on a hot plate (60° C./20 min.+150° C./1 hr+250° C./30 min.+330° C./1 hr) to give a clear film having an absorption peak at 525 nm, strongly indicating uniform dispersion of Au nanoparticles supported by the sol.

(ii) Epoxy system: The sol powder (0.025 g) is dissolved into a resin comprised of bisphenol A diglycidyl ether (0.23 g), bisphenol A propoxylate/ethoxylate (0.04 g), Z6040 silane (0.002 g) and methoxyethanol (0.05 g). The resulting solution is poured onto a glass plate and cured at 80° C./1 hr and 150° C./2 hrs to give a clear wine-red film (λmax=539 nm).

(iii) Acrylic system: The sol powder (0.025 g) is dissolved in a resin comprised of CN104D80 (0.25 g, from Sartomer Co), hydroxyethyl methacrylate (0.05 g), Z6030 silane (0.002 g), benzil dimethyl ketal photoinitiator (0.003 g) and methoxyethanol (0.04 g). The resulting solution is poured onto a glass plate, heated to 60° C./20 minutes and exposed to UV (300 W UV lamp) for 2 minutes under nitrogen to give a clear wine-red film (λmax=540 nm).

EXAMPLE 28

Example 28 describes the preparation of polyurethane/metal oxide sol nanocomposite. The sol powder (0.03 g) prepared in Example 2 and stored for 36 months is heat-treated at 200° C./1 hr. The sol is combined with glycerol propoxylate (MW 1500, 0.07 gm), glycerol propoxylate (MW3000, 0.04 g), bisphenol A propoxylate/ethoxylate (0.04 g) and dry acetone (0.5 g) and stirred at RT/overnight. After addition of 3-aminopropyltrimethoxysilane (0.003 g) and isophorone diisocyanate (0.024 g), the resulting solution is stirred for additional 2 hrs. Subsequently, isophorone diisocyanate (0.05 g) is added. The resulting solution is then cast on a glass plate and allowed to stand at RT/2 hrs and 80° C./2 hrs to generate a film that is optically transparent and non-yellowing. The use of tin catalysts widely used for polyurethane systems is found to accelerate the reaction even in the presence of the sol additive. For example, addition of dibutyltin dilaurate (0.004 g) to the above mixture is able to provide a tackfree film after 2 hrs at room temperature.

EXAMPLE 29

Example 29 describes the preparation of aluminum oxide sol by use of ammonium hydrogen fluoride followed by base catalysts. A solution of 75% aluminum sec-butoxide in butanol (0.333 gm, 1.01 mmol) is combined with methoxyethanol (1.0 gm) and then with phenyltrimethoxysilane (0.207 gm, 1.05 mmol). To the resulting clear solution is slowly added 2% ammonium hydrogen fluoride in DI water (25 mg) while stirred vigorously. The solution, initially forms precipitates, gradually becomes clear after stirring at RT/30 minutes. Addition of DI water (0.055 gm, 3 mmol) followed by stirring at RT/overnight and then 80° C./2 hrs gives a viscous hazy solution. Removal of the volatiles followed by heat treatment at 120° C./1 hr gives colorless residues (0.247 gm). The dried sol (40.1 mg) is dissolved in methoxyethanol (0.5 gm) to obtain a clear solution. The solution is then treated with tetraethylammonium hydroxide (1 mg) at 120° C./2 hrs. Removal of the volatiles followed by heat-treatment at 210° C./3 hrs to give yellowish residues (33.1 mg) that are readily soluble in methoxyethanol to give a clear yellowish solution.

EXAMPLE 30

Example 30 describes the treatment of a metal oxide sol with a silylating agent. The dried sol prepared in Example 29 and heat-treated at 120° C. (30.7 mg) is suspended in dry toluene (0.5 gm) and, after addition of hexamethyldisilazane ($Me_3SiNHSiMe_3$) (3 mg), is stirred at RT/overnight and 110° C./3 hrs to give a clear solution. Evaporation of the volatiles followed by heat-treatment at 180° C./20 minutes to give colorless residues (22.9 mg) that are soluble in methylene chloride and xylene.

EXAMPLE 31

Example 31 describes the preparation of aluminum oxide sol catalyzed by boron trifluoride-amine complex. A solution of 75% aluminum sec-butoxide in butanol (0.2 gm, 0.61 mmol) is combined with methoxyethanol (1.0 gm) and then with phenyltrimethoxysilene (0.12 gm, 0.61 mmol). To the resulting clear solution is added boron trifluoride-N-butyl-1-butamine complex (1 mg) in DI water (0.015 mg) while stirred vigorously. The solution, initially forms precipitates, gradually becomes clear after stirring at RT/30 minutes. Addition of DI water (0.055 gm, 3 mmol) followed by stirring at RT/overnight and then 80° C./4 hrs gives a slightly hazy solution. Removal of the volatiles followed by heat treatment at 120° C./1 hr gives colorless residues (0.145 gm). The dried sol (22 mg) is further heat-treated in an oven at 180° C./1 hr and then mixed with methoxyethanol (0.4 gm) at 120° C./2 hrs to obtain a clear solution. The solution is then treated with tetraethylammonium hydroxide (0.3 mg) at 120° C./4 hrs. Removal of the volatiles followed by heat-treatment at 220° C./3 hrs gives yellowish residues (18 mg). Addition of methoxyethanol (0.3 gm) gives a yellowish clear solution that becomes colorless upon heating to 120° C./2 hrs.

EXAMPLE 32

Example 32 describes the preparation of aluminum oxide sol catalyzed by cationic photoinitiator. A solution of 75% aluminum sec-butoxide in butanol (0.2 gm, 0.61 mmol) is combined with methoxyethanol (1.3 gm) and then with phenyltrimethoxysilene (0.12 gm, 0.61 mmol). To the resulting clear solution is added Cyracure photoinitiator UVI6976 from Dow Chemical (triarylsulfonium hexafluoroantimonate salt, 2 mg). The solution is first exposed to UV light while stirred at RT/10 min and then admixed with DI water (0.015 mg) while stirred vigorously. The solution, initially forms precipitates, gradually becomes clear after stirring at RT/30 minutes. Addition of DI water (0.06 gm, 3.3 mmol) followed by stirring at RT/overnight and then 80° C./4 hrs gives a slightly hazy solution. Removal of the volatiles followed by heat treatment at 120° C./1 hr gives colorless residues (0.147 gm). The dried sol (18 mg) is further heat-treated in an oven at 180° C./1 hr and then mixed with methoxyethanol (0.4 gm) at 120° C./2 hrs to obtain a clear solution. The solution is then treated with tetraethylammonium hydroxide (0.3 mg) at 120° C./4 hrs. Removal of the volatiles followed by heat-treatment at 220° C./3 hrs gives yellowish residues (14 mg). Addition of methoxyethanol (0.3 gm) gives a yellowish clear solution that becomes colorless upon heating to 120° C./2 hrs.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of making a nanocomposite comprising combining:
   from about 10% to about 80% by weight with regard to the weight of nanocomposite, of at least one metal oxide compound;
   from about 10% to about 60% by weight with regard to the weight of nanocomposite, of at least one organofunctional silane;
   from about 0.5 to about 80% by weight with regard to the weight of the nanocomposite, of at least one boron oxide compound, and/or an effective amount of at least one of an acid catalyst and salt/complex catalyst compound to facilitate a reaction between the metal oxide compound and the organofunctional silane, and
   a liquid to provide a host metal oxide sol;
   adding from about 0.001% to about 80% by weight with regard to the nanocomposite, of at least one of guest metal nanoparticle, guest metal phosphate nanoparticle, guest metal oxide nanoparticle, precursors of these guest nanoparticles and guest metal-chalcogenide precursors to the said host metal oxide sol to provide a host guest metal oxide sol; and
   chalcogenizing the said host guest metal oxide sol to provide a nanocomposite comprising the host metal oxide sol and guest metal-chalcogenide nanoparticles.

2. The method of claim 1, wherein the metal oxide compound comprises a compound represented by Formula i:

$$M_aO_k(OR^1)_b \qquad (I)$$

wherein each M is a transition metal, alkaline earth metal, post-transition metal, or alkali metal, each $R^1$ is independently a hydrogen or a hydrocarbyl group containing from 1 to about 18 carbon atoms, wherein at least one $R^1$ is a hydrocarbyl group, a is from 1 to about 5, k is 0 to about 10, and b is from 1 to about 20;

the organofunctional silane comprises a compound represented by Formula II:

$$(R^2)_{4-c}Si(X)_c \qquad (II)$$

wherein c is 1 to 3, each X is individually a hydrogen, halogen, carboxylate, amino, hydroxy or an alkoxy group containing from 1 to about 4 carbon atoms, and each $R^2$ is individually an organofunctional containing organic group containing from about 1 to about 24 carbon atoms including at least one selected from the group consisting of heterocyclic, acryloxy, cyano, phosphino, amino, amide, vinyl, epoxy, glycidoxy, aryl, alkyl, a carbon carbon triple bond containing group, mercapto, siloxy, halocarbon, and a carbon carbon double bond containing group; and the boron oxide compound comprises a compound represented by Formula III:

$$B(OH)_d(OR^3)_{3-d} \qquad (III)$$

wherein each $R^3$ is independently a hydrocarbyl group containing from 1 to about 8 carbon atoms, and d is from 0 to about 3, or the boron oxide compound comprises a compound represented by Formula IV:

$$B(OH)_e(OR^4)_f(R^5)_{3-(e+f)} \qquad (IV)$$

wherein each $R^4$ is independently a hydrocarbyl group containing from 1 to about 8 carbon atoms, each $R^5$ is independently a hydrocarbyl group containing from 1 to about 24 carbon atoms, e is from 0 to about 3, and f is from 0 to about 3.

3. The method of claim 1, wherein the guest metal nanoparticle precursor comprises at least one selected from the group consisting of zero-valent metal, metal oxides, metal carboxylates, metal hydroxides, metal nitrates, metal halides, metal cyanides, metal alkoxides and chelated metals.

4. The method of claim 1, wherein the guest metal nanoparticle comprises at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

5. The method of claim 1 further comprises removing the liquid phase of the nanocomposite to provide a dried nanocomposite, the dried nanocomposite comprising less than about 0.5% by weight of water.

6. A method of making a nanocomposite comprising combining:
   from about 10% to about 80% by weight with regard to the weight of nanocomposite, of at least one metal oxide compound;
   from about 10% to about 60% by weight with regard to the weight of nanocomposite, of at least one organofunctional silane;
   from about 0.5 to about 80% by weight with regard to the weight of the nanocomposite, of at least one boron oxide compound, and/or an effective amount of at least one of an acid catalyst and salt/complex catalyst compound to facilitate a reaction between the metal oxide compound and the organofunctional silane, and
   a liquid to provide a host metal oxide sol;
   adding from about 0.001% to about 80% by weight with regard to the nanocomposite, of at least one of guest metal nanoparticle, guest metal-chalcogenide nanoparticle, guest metal phosphate nanoparticle, precursors of these guest metal nanoparticles and guest metal oxide precursors to the said host metal oxide sol to provide a host guest metal oxide sol; and oxidizing the said host guest metal oxide sol to provide a nanocomposite comprising the host metal oxide sol and guest metal oxide nanoparticles.

7. A method of making a nanocomposite comprising combining:
from about 10% to about 80% by weight with regard to the weight of nanocomposite, of at least one metal oxide compound;
from about 10% to about 60% by weight with regard to the weight of nanocomposite, of at least one organofunctional silane;
from about 0.5 to about 80% by weight with regard to the weight of the nanocomposite, of at least one boron oxide compound, and/or an effective amount of at least one of an acid catalyst and salt/complex catalyst compound to facilitate a reaction between the metal oxide compound and the organofunctional silane, and
a liquid to provide a host metal oxide sol;
adding from about 0.001% to about 80% by weight with regard to the nanocomposite, of at least one of guest metal nanoparticle, guest metal-chalcogenide nanoparticle, guest metal oxide nanoparticle, precursors of these guest metal nanoparticles and guest metal phosphate precursors to the said host metal oxide sol to provide a host guest metal oxide sol; and
phosphatizing the said host guest metal oxide sol to provide a nanocomposite comprising the host metal oxide sol and guest metal phosphate nanoparticles.

8. The method of claim 6, wherein the guest metal oxide nanoparticles comprise metal oxide sols.

9. The method of claim 7, wherein the guest metal phosphate nanoparticles comprise metal phosphate sols.

10. The method of claim 6, wherein the metal oxide compound comprises a compound represented by Formula I:

$$M_aO_k(OR^1)_b \qquad (i)$$

wherein each M is a transition metal, alkaline earth metal, post-transition metal, or alkali metal, each $R^1$ is independently a hydrogen or a hydrocarbyl group containing from 1 to about 18 carbon atoms, wherein at least one $R^1$ is a hydrocarbyl group, a is from 1 to about 5, k is 0 to about 10, and b is from 1 to about 20;

the organofunctional silane comprises a compound represented by Formula II:

$$(R^2)_{4-c}Si(X)_c \qquad (II)$$

wherein c is 1 to 3, each X is individually a hydrogen, halogen, carboxylate, amino, hydroxy or an alkoxy group containing from 1 to about 4 carbon atoms, and each $R^2$ is individually an organofunctional containing organic group containing from about 1 to about 24 carbon atoms including at least one selected from the group consisting of heterocyclic, acryloxy, cyano, phosphino, amino, amide, vinyl, epoxy, glycidoxy, aryl, alkyl, a carbon carbon triple bond containing group, mercapto, siloxy, halocarbon, and a carbon carbon double bond containing group; and the boron oxide compound comprises a compound represented by Formula III:

$$B(OH)_d(OR^3)_{3-d} \qquad (III)$$

wherein each $R^3$ is independently a hydrocarbyl group containing from 1 to about 8 carbon atoms, and d is from 0 to about 3, or the boron oxide compound comprises a compound represented by Formula IV:

$$B(OH)_e(OR^4)_f(R^5)_{3-(e+f)} \qquad (IV)$$

wherein each $R^4$ is independently a hydrocarbyl group containing from 1 to about 8 carbon atoms, each $R^5$ is independently a hydrocarbyl group containing from 1 to about 24 carbon atoms, e is from 0 to about 3, and f is from 0 to about 3.

11. The method of claim 6, wherein the guest metal nanoparticle precursor comprises at least one selected from the group consisting of zero-valent metal, metal oxides, metal carboxylates, metal hydroxides, metal nitrates, metal halides, metal cyanides, metal alkoxides and chelated metals.

12. The method of claim 6, wherein the guest metal nanoparticle comprises at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

13. The method of claim 6 further comprises removing the liquid phase of the nanocomposite to provide a dried nanocomposite, the dried nanocomposite comprising less than about 0.5% by weight of water.

14. The method of claim 7, wherein the metal oxide compound comprises a compound represented by Formula I:

$$M_aO_k(OR^1)_b \qquad (I)$$

wherein each M is a transition metal, alkaline earth metal, post-transition metal, or alkali metal, each $R^1$ is independently a hydrogen or a hydrocarbyl group containing from 1 to about 18 carbon atoms, wherein at least one $R^1$ is a hydrocarbyl group, a is from 1 to about 5, k is 0 to about 10, and b is from 1 to about 20;

the organofunctional silane comprises a compound represented by Formula II:

$$(R^2)_{4-c}Si(X)_c \qquad (II)$$

wherein c is 1 to 3, each X is individually a hydrogen, halogen, carboxylate, amino, hydroxy or an alkoxy group containing from 1 to about 4 carbon atoms, and each $R^2$ is individually an organofunctional containing organic group containing from about 1 to about 24 carbon atoms including at least one selected from the group consisting of heterocyclic, acryloxy, cyano, phosphino, amino, amide, vinyl, epoxy, glycidoxy, aryl, alkyl, a carbon carbon triple bond containing group, mercapto, siloxy, halocarbon, and a carbon carbon double bond containing group; and the boron oxide compound comprises a compound represented by Formula III:

$$B(OH)_d(OR^3)_{3-d} \qquad (III)$$

wherein each $R^3$ is independently a hydrocarbyl group containing from 1 to about 8 carbon atoms, and d is from 0 to about 3, or the boron oxide compound comprises a compound represented by Formula IV:

$$B(OH)_e(OR^4)_f(R^5)_{3-(e+f)} \qquad (IV)$$

wherein each $R^4$ is independently a hydrocarbyl group containing from 1 to about 8 carbon atoms, each $R^5$ is independently a hydrocarbyl group containing from 1 to about 24 carbon atoms, e is from 0 to about 3, and f is from 0 to about 3.

15. The method of claim 7, wherein the guest metal nanoparticle precursor comprises at least one selected from the group consisting of zero-valent metal, metal oxides, metal carboxylates, metal hydroxides, metal nitrates, metal halides, metal cyanides, metal alkoxides and chelated metals.

16. The method of claim 7, wherein the guest metal nanoparticle comprises at least one metal atom selected from the group consisting of aluminum, antimony, arsenic, barium, beryllium, bismuth, cadmium, calcium, cerium, chromium, cobalt, copper, dysprosium, erbium, europium, gadolinium, gallium, gold, hafnium, holmium, indium, iridium, iron, lanthanum, lead, lithium, lutetium, magnesium, manganese, mercury, molybdenum, neodymium, nickel, niobium, osmium, palladium, platinum, potassium, praseodymium, rhenium, rhodium, rubidium, ruthenium, samarium, scandium, silver, strontium, tantalum, technetium, terbium, titanium, thallium, thorium, thulium, tin, tungsten, uranium, vanadium, ytterbium, yttrium, zinc, and zirconium.

17. The method of claim 7 further comprises removing the liquid phase of the nanocomposite to provide a dried nanocomposite, the dried nanocomposite comprising less than about 0.5% by weight of water.

* * * * *